United States Patent
Li et al.

(10) Patent No.: US 12,381,207 B2
(45) Date of Patent: Aug. 5, 2025

(54) DESODIATED SODIUM TRANSITION METAL OXIDES FOR PRIMARY BATTERIES

(71) Applicant: President and Fellows of Harvard College, Cambridge, MA (US)

(72) Inventors: Xin Li, Belmont, MA (US); Li Hai, Cambridge, MA (US); Yichao Wang, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 694 days.

(21) Appl. No.: 17/601,191

(22) PCT Filed: Apr. 6, 2020

(86) PCT No.: PCT/US2020/026827
§ 371 (c)(1),
(2) Date: Oct. 4, 2021

(87) PCT Pub. No.: WO2020/214443
PCT Pub. Date: Oct. 22, 2020

(65) Prior Publication Data
US 2022/0166012 A1    May 26, 2022

Related U.S. Application Data

(60) Provisional application No. 62/829,278, filed on Apr. 4, 2019.

(51) Int. Cl.
*H01M 4/38* (2006.01)
*H01M 4/525* (2010.01)
*H01M 6/04* (2006.01)

(52) U.S. Cl.
CPC ............. *H01M 4/38* (2013.01); *H01M 4/525* (2013.01); *H01M 6/045* (2013.01)

(58) Field of Classification Search
CPC .......... H01M 4/38; H01M 4/381; H01M 6/00; H01M 6/02
See application file for complete search history.

(56) References Cited

U.S. PATENT DOCUMENTS 5,470,671 A    11/1995    Fletcher et al.
6,492,062 B1   12/2002    Wang et al.
(Continued)

FOREIGN PATENT DOCUMENTS

CN    105518906 A    4/2016
CN    107851840 A    3/2018
(Continued)

OTHER PUBLICATIONS

Liu et al, Achieving a Deeply Desodiated Stabilized Cathode Material by the High Entropy Strategy for Sodium-ion Batteries, Angewandte Chemie, 63, 2024. (Year: 2024).*
(Continued)

*Primary Examiner* — Amanda C. Walke
(74) *Attorney, Agent, or Firm* — Clark & Elbing LLP

(57) ABSTRACT

The invention provides primary batteries that incorporate a desodiated sodium transition metal oxide into the positive electrode (a cathode). Batteries of the invention using a desodiated sodium transition metal oxide in the cathode exhibit discharge voltages, battery capacities, and energy densities higher than a traditional $Zn$—$MnO_2$ dry cell battery, such as a commercially available AA battery. These batteries are also advantageous over comparable lithium ion batteries due to the high abundance and low cost of sodium precursor materials with similar electrical performance.

12 Claims, 13 Drawing Sheets

(56) References Cited

U.S. PATENT DOCUMENTS

| | | | |
|---|---|---|---|
| 9,356,316 | B2 | 5/2016 | Sun et al. |
| 9,399,404 | B2 | 7/2016 | Ose et al. |
| 9,634,360 | B2 | 4/2017 | Hayashi et al. |
| 9,819,024 | B2 | 11/2017 | Chao et al. |
| 10,090,557 | B2 | 10/2018 | Trevey et al. |
| 11,777,138 | B2 | 10/2023 | Li et al. |
| 2005/0233206 | A1 | 10/2005 | Puttaiah et al. |
| 2010/0129724 | A1 | 5/2010 | Kolosnitsyn |
| 2010/0285372 | A1 | 11/2010 | Lee et al. |
| 2011/0223477 | A1 | 9/2011 | Nelson et al. |
| 2014/0193691 | A1 | 7/2014 | Ueki et al. |
| 2014/0342222 | A1 | 11/2014 | Kim et al. |
| 2016/0211498 | A1 | 7/2016 | Kim et al. |
| 2016/0276641 | A1 | 9/2016 | Umeyama et al. |
| 2017/0170473 | A1 | 6/2017 | Peled et al. |
| 2018/0090758 | A1 | 3/2018 | Xu et al. |
| 2019/0198921 | A1 | 6/2019 | Takano et al. |
| 2019/0260066 | A1 | 8/2019 | Hu et al. |
| 2019/0296305 | A1 | 9/2019 | Ito et al. |
| 2019/0305293 | A1 | 10/2019 | Sotowa et al. |
| 2020/0220172 | A1 | 7/2020 | Xiao et al. |
| 2020/0365887 | A1 | 11/2020 | Zaghib et al. |
| 2021/0280850 | A1 | 9/2021 | Petrovic |
| 2021/0408580 | A1 | 12/2021 | Ye et al. |

FOREIGN PATENT DOCUMENTS

| | | | | |
|---|---|---|---|---|
| JP | 2015-095281 | A | | 5/2015 |
| KR | 10-2018-0094184 | A | | 8/2018 |
| KR | 20190013503 | A | * | 2/2019 |
| WO | WO-2016/026130 | A1 | | 2/2016 |
| WO | WO-2018/098494 | A1 | | 5/2018 |
| WO | WO-2018/123967 | A1 | | 7/2018 |
| WO | WO-2019/104181 | A1 | | 5/2019 |
| WO | WO-2020/112843 | A1 | | 6/2020 |
| WO | WO-2021038263 | A1 | * | 3/2021 ............. C01G 37/14 |
| WO | WO-2022/094412 | A1 | | 5/2022 |

OTHER PUBLICATIONS

Kato et al., "$Li_{10}GeP_2S_{12}$-Type Superionic Conductors: Synthesis, Structure, and Ionic Transportation," Adv Energy Mater. 10(42):2002153 (Sep. 2020) (25 pages).

Zhou et al., "Solvent-Engineered Design of Argyrodite $Li_6PS_5X$ (X=CI, Br, I) Solid Electrolytes with High Ionic Conductivity," ACS Energy Lett. 4(1):265-70 (Nov. 2018).

Adeli et al., "Boosting Solid-State Diffusivity and Conductivity in Lithium Superionic Argyrodites by Halide Substitution," Angew Chem Int Ed Engle. 58(26):8681-8686 (Jun. 24, 2019).

Asano et al., "Solid Halide Electrolytes with High Lithium-Ion Conductivity for Application in 4 V Class Bulk-Type All-Solid-State Batteries," Adv Mater. 30:1-7 (Sep. 14, 2018).

Auvergniot et al., "Interface Stability of Argyrodite $Li_6PS_5CI$ toward $LiCoO_2$, $LiNi_{1/3}Co_{1/3}Mn_{1/3}O2$, and $LiMn_2O_4$ in Bulk All-Solid-State Batteries," Chem Mater. 29(9):3883-3890 (Apr. 7, 2017).

Bishop, C.M., Pattern Recognition and Machine Learning, Springer Science+Business Media, LLC., (2006) (12 pages).

Braga et al., "Novel $Li_3CIO$ based glasses with superionic properties for lithium batteries," J Mater Chem A. 2(15):5470-5480 (Mar. 7, 2014).

Chang et al., "X-ray Photoelectron Spectroscopy Equipped with Gas Cluster Ion Beams for Evaluation of the Sputtering Behavior of Various Nanomaterials," ACS Appl. Nano Mater. 5(3):4260-4268 (Jan. 31, 2022) (9 pages).

Chen et al., "Li metal deposition and stripping in a solid-state battery via Coble creep," Nature. 578(7794):251-255 (Feb. 3, 2020) (8 pages).

Chen et al., "Reversible flat to rippling phase transition in Fe containing layered battery electrode materials," Adv Funct Mater. 28(39):https://doi.org/10.1002/adfm.201803896 (2018) (22 pages) manuscript.

Chen et al., "Super charge separation and high voltage phase in $Na_xMnO_2$," Adv Funct Mater. 28:https://doi.org/10.1002/adfm.201805105 (Oct. 2018) (24 pages) manuscript.

Cheng et al., "High rate performance of the carbon encapsulated $Li_4Ti_5O_{12}$ for lithium ion battery," Results in Physics. 7:810-2 (2017).

Cheng et al., "Intergranular Li metal propagation through polycrystalline $Li_{6.25}Al_{0.25}La_3Zr_2O_{12}$ ceramic electrolyte," Electrochimica Acta. 223:85-91 (Jan. 1, 2017). manuscript (23 pages).

Choi et al., "Li-ion batteries from $LiFePO_4$ cathode and anatase/graphene composite anode for stationary energy storage," Electrochemistry Communications. 12(3):378-381 (Mar. 2010).

Deviannapoorani et al., "Lithium ion transport properties of high conductive tellurium substituted $Li_7La_3Zr_2O_{12}$ cubic lithium garnets," J Power Sci. 240:18-25 (Oct. 15, 2013).

Ding et al., "Determination of the diffusion coefficient of lithium ions in nano-Si," *Solid State Ionics* 180(2-3):222-225 (Mar. 2009) (4 pages).

Doeff et al., "Orthorhombic $Na_xMnO_2$ as a cathode material for secondary sodium and lithium polymer batteries," Journal of the Electrochemical Society. 141(11):L145-L147 (1994).

Du et al., "Structures, Thermodynamics, and $Li^+$ Mobility of $Li_{10}GeP_2S_{12}$: A First-Principles Analysis," J Phys Chem. 118(20):10590-10595 (May 1, 2014).

El-Shinawi et al., "Enhancement of the lithium ion conductivity of Ta-doped $Li_7La_3Zr_2O_{12}$ by incorporation of calcium," Dalton Trans. 46(29):9415 (Jul. 3, 2017) (5 pages).

Fitzhugh et al., "A High-Throughput Search for Functionally Stable Interfaces in Sulfide Solid-State Lithium Ion Conductors," Adv Energy Mater. 9(21):1900807 (Apr. 24, 2019) (12 pages).

Fitzhugh et al., "Solid-electrolyte-interphase design in constrained ensemble for solid-state batteries," Energy Environ. Sci. 14(8):4574-4583 (Jul. 20, 2021) (21 pages).

Fitzhugh et al., "Strain-Stabilized Ceramic-Sulfide Electrolytes," Small. 15(33):e1901470 (Jul. 3, 2019) (14 pages).

Fitzhugh et al., "The effects of mechanical constriction on the operation of sulfide based solid-state batteries," J Mater Chem A. DOI:10.1039/C9TA05248H (Sep. 13, 2019) (24 pages).

Geiger et al., "Crystal Chemistry and Stability of "$Li_7La_3Zr_2O_{12}$" Garnet: A Fast Lithium-Ion Conductor," Inorg Chem. 50(3):1089-1097 (Dec. 28, 2010).

Ghosh et al., "Study of inelastic mean free path of metal nanostructures using energy filtered transmission electron microscopy imaging" J. Microsc. 258(3): 253-8 (2015).

Gil-González et al., "Synergistic effects of chlorine substitution in sulfide electrolyte solid state batteries," *Energy Storage Mater.* 45:484-493 (Dec. 9, 2021) (10 pages).

Goodenough et al., "Challenges for Rechargeable Li Batteries," Chem Mat. 22:587-603 (Aug. 28, 2009).

Goodenough et al., "The Li-Ion Rechargeable Battery: A Perspective," J Am Chem Soc. 135(4):1167-1176 (Jan. 7, 2013).

Han et al., "A Battery Made from a Single Material," Adv Mat. 27(23):3473-3483 (Apr. 30, 2015).

Han et al., "Electrochemical Stability of $Li_{10}GeP_2S_{12}$ and $Li_7La_{3Zr2}O_{12}$ Solid Electrolytes," Adv Energy Mater. 6(8):1501590 (Jan. 21, 2016) (29 pages) manuscript.

Hayashi et al., "All-solid-state Li/S batteries with highly conductive glass-ceramic electrolytes," Electrochemistry Communications. 5(8):701-705 (Aug. 2003).

International Search Report and Written Opinion for International Application No. PCT/US2020/026827, mailed Oct. 1, 2020 (14 pages).

Jain et al., "Commentary: The Materials Project: A materials genome approach to accelerating materials innovation," Apl Mater. 1:011002 (Jul. 18, 2013) (11 pages).

Jin et al., "Covalently Connected Carbon Nanostructures for Current Collectors in Both the Cathode and Anode of Li—S Batteries," Adv Mater. 28(41):9094-9102 (Nov. 2, 2016).

Jin et al., "Self-healing SEI enables full-cell cycling of a silicon-majority anode with a coulombic efficiency exceeding 99.9%," Energy Environ Sci. 10:580-592 (Jan. 6, 2017).

Kamaya et al., "A lithium superionic conductor," Nature Mat. 10(9):682-686 (Jul. 31, 2011).

(56) References Cited

OTHER PUBLICATIONS

Kang et al., "Battery materials for ultrafast charging and discharging," Nature. 458(7235):190-193 (Mar. 12, 2009).

Kasemchainan et al., "Critical stripping current leads to dendrite formation on plating in lithium anode solid electrolyte cells," Nat Mater. 18:1105-1111 (Jul. 29, 2019) (24 pages). manuscript.

Kato et al., "High-power all-solid-state batteries using sulfide superionic conductors," Nature Energy. 1:1-7 (2016) (32 pages).

Khurana et al., "Suppression of Lithium Dendrite Growth Using Cross-Linked Polyethylene/Poly(ethylene oxide) Electrolytes: A New Approach for Practical Lithium-Metal Polymer Batteries," J Am Chem Soc. 136(20):7395-402 (Apr. 22, 2014).

Kim et al., "A critical size of silicon nano-anodes for lithium rechargeable batteries," Angew. Chemie—Int. Ed. 49(12):2146-2149 (Feb. 19, 2010) (4 pages).

Kim et al., "Electrochemical Stability of $Li_{6.5}La_3Zr_{1.5}M_{0.5}O_{12}$ (M=Nb or Ta) against Metallic Lithium," Front Energy Res. 4:1-7 (May 20, 2016).

Kim, J. S. et al. Three-dimensional silicon/carbon core-shell electrode as an anode material for lithium-ion batteries. J. Power Sources 279, 13-20 (2015).

Krauskopf et al., "Physicochemical Concepts of the Lithium Metal Anode in Solid-State Batteries," Chem Rev. 120(15):7745-7794 (Jul. 27, 2020).

Kuhn et al., "Tetragonal $Li_{10}GeP_2S_{12}$ and $Li_7GePS_8$—exploring the Li ion dynamics in LGPS Li electrolytes," Energy Environ Sci. 6:3548-3552 (Oct. 7, 2013).

Kyoung et al., "Electronic structures of $SiO_2$thim films via Ar gas cluster ion beam sputtering" Surf. Interface Anal. 46: 58-61 (2014).

Lee et al., "High-energy long-cycling all-solid-state lithium metal batteries enabled by silver-carbon composite anodes," Nat Energy. 5:299-308 (Mar. 9, 2020).

Lee et al., "Lithiation pathway mechanism of Si—C composite anode revealed by the role of nanopore using in situ lithiation" ACS Energy Lett. 7: 2469-76 (2022).

Li et al., "Air-stable Li3InCl6 electrolyte with high voltage compatibility for all-solid-state batteries," Energy Environ Sci. 12:2665-2671 (Aug. 28, 2019).

Li et al., "Developing High-Performance Lithium Metal Anode in Liquid Electrolytes: Challenges and Progress," Adv. Mater. 30(17):e1706375 (author manuscript) (Apr. 2018) (78 pages).

Li et al., "Extending the Service Life of High-Ni Layered Oxides by Tuning the Electrode-Electrolyte Interphase," Adv Nat Mater. 8:1-11 (Sep. 10, 2018) (33 pages). manuscript.

Li et al., "Long-Term Cyclability of NCM-811 at High Voltages in Lithium-Ion Batteries: an In-Depth Diagnostic Study," Chem Mater. 32(18):7796-7804 (Aug. 27, 2020).

Li et al., "Mesoporous silicon sponge as an anti-pulverization structure for high-performance lithium-ion battery anodes," Nat. Commun. 5(4105) (Jul. 8, 2014) (7 pages).

Li et al., "Solid Electrolyte: the Key for High-Voltage Lithium Batteries," Adv Energy Mat. 5(4):1401408 (Oct. 14, 2014) (21 Pages) manuscript.

Li, Xin, "Critical Assembly and Test Procedures Driven by Mechanical Constriction Principle for Advanced Performances of Solid-State Batteries," Adv Energy Sustainability Res. 2(6):2100003 (Apr. 7, 2021) (9 pages).

Li, Xin, "Constrictions Induced Metastability and Kinetic Stability for Advanced Solid-State Battery Design," Encyclopedia of Energy Storage. 4:180-190 (Jan. 2021) (12 pages).

Liang et al., "In Situ $Li_3$ $PS_4$ Solid-State Electrolyte Protection Layers for Superior Long-Life and High-Rate Lithium-Metal Anodes," Adv Mater. 30(45):e1804684 (Oct. 1, 2018) (9 pages).

Liang et al., "Site-Occupation-Tuned Superionic $Li_xScCl_{3+x}$Halide Solid Electrolytes for All-Solid-State Batteries," J Am Chem Soc. 142(15):7012-7022 (Mar. 26, 2020).

Lin et al., "Lithium plating mechanism, detection, and mitigation in lithium-ion batteries" Prog. Energy Combust Sci. 87:100953 (2021) (30 Pages).

Lin et al., "Low-Temperature Behavior of Li-Ion Cells," Electrochem Solid-State Lett. 4(6):A71-A73 (Apr. 12, 2001).

Liu et al., "Pathways for practical high-energy long-cycling lithium metal batteries," Nat Energy. 4:180-186 (Feb. 25, 2019).

Ma et al., "Electrochemical properties of Monoclinic $NaMnO_2$," Journal of the Electrochemical Society. 158(12):A1307-A1312 (2011).

Mangani et al., "Mechanical vs. chemical stability of sulphide-based solid-state batteries. Which one is the biggest challenge to tackle? Overview of solid-state batteries and hybrid solid state batteries," J Mater Chem A. 8(20):10150-10167 (Apr. 28, 2020) (19 pages). manuscript.

Manthiram et al., "Lithium battery chemistries enabled by solid-state electrolytes," Nature reviews materials. 2:1-16 (Feb. 14, 2017).

Masias et al., "Elastic, plastic, and creeep mechanical properties of lithium metal" J. Mater. Sci. 54: 2585-2600 (Oct. 3, 2018).

Mizuno et al., "High lithium ion conducting glass-ceramics in the system $Li_2S-P_2S_5$," Solid State Ionics. 177:2721-2725 (Oct. 2006).

Mizuno et al., "New, Highly Ion-Conductive Crystals Precipitated from $Li_2S-P_2S_5$ Glasses," Adv Mater. 17(7):918-921 (Apr. 4, 2005).

Mo et al., "First Principles Study of the $Li_{10}GeP_2S_{12}$ Lithium Super Ionic Conductor Material," Chem Mater. 24(1):15-17 (Dec. 9, 2011) (4 pages). manuscript.

Morimoto et al., "Mechanochemical Synthesis of New Amorphous Materials of $60Li_2S \cdot 40SiS_2$ with High Lithium Ion Conductivity," J Am Chem Soc. 82(5):1352-1354 (Dec. 21, 2004).

Murugan et al., "Fast Lithium Ion Conduction in Garnet-Type $Li_7La_3Zr_2O_{12}$," Agnew Chem Int Ed. 46(41):7778-7781 (Oct. 15, 2007).

Nagao et al., "High-capacity $Li_2$S-nanocarbon composite electrode for all-solid-state rechargeable lithium batteries," J Mat Chem. 22:10015-10020 (Apr. 13, 2012).

Ning et al., "Visualizing plating-induced cracking in lithium-anode solid-electrolyte cells," Nature Mater. 20(8):1121-1129 (Apr. 22, 2021) (20 pages).

Ong et al., "Li—Fe—P—$O_2$ Phase Diagram from First Principles Calculations," Chem Mater. 20(5):1798-1807 (Feb. 7, 2008).

Ong et al., "Phase stability, electrochemical stability and ionic conductivity of the $Li_{10+1}MP_2X_{12}$ (M=Ge, Si, Sn, Al or P, and X=O, S or Se) family of superionic conductors," Energy Environ Sci. 6(1):148 (Oct. 2, 2012) (23 pages). manuscript.

Pan et al., "Electrochemical Properties of All-solid-state Lithium Batteries with Amorphous $FeS_x$-based Composite Positive Electrodes Prepared via Mechanochemistry," Electrochemistry. 86(4):175-178 (Jun. 1, 2018).

Park et al., "High-Voltage Superionic Halide Solid Electrolytes for All-Solid-State Li-Ion Batteries," ACS Energy Lett. 5(2):533-539 (Jan. 9, 2020) (17 pages). manuscript.

Peng et al., "Nanoarchitectured Graphene/CNT@Porous Carbon with Extraordinary Electrical Conductivity and Interconnected Micro/Mesopores for Lithium-Sulfur Batteries," Adv Funct Mater. 24:2772-2781 (Jan. 30, 2014).

Pietsch et al., "Quantifying microstructural dynamics and electrochemical activity of graphite and silicon-graphite lithium ion battery anodes," Nat. Commun. 7(12909):1-11 (Sep. 27, 2016) (11 pages).

Qi et al., "A New General Paradigm for Understanding and Preventing Li Metal Penetration through Solid Electrolytes," Joule. 4(12):2599-2608 (Dec. 16, 2020).

Rangasamy et al., "An Iodide-Based $Li_7P_2S_8$I Superionic Conductor," J Am Chem Soc. 137(4):1384-1387 (Jan. 20, 2015).

Ren et al., "Oxide Electrolytes for Lithium Batteries," J Am Chem Soc. 98(12):3603-3623 (Sep. 22, 2015).

Richards et al., "Interface Stability in Solid-State Batteries," Chem Mater. 28(1):266-273 (Dec. 7, 2015).

Ryou et al., "A microgrid-patterned silicon electrode as an electroactive lithium host" Energy Environ. Sci. 15: 2581-90 (2022).

Sallard et al., "Cr-Doped Li-Rich Nickel Cobalt Manganese Oxide as a Positive Electrode Material in Li-Ion Batteries to Enhance Cycling Stability," ACS Appl Energy Mater. 3(9):8646-9657 (Aug. 10, 2020).

(56) References Cited

OTHER PUBLICATIONS

Saroha et al., "Development of surface functionalized ZnO-doped LiFePO$_4$/C composites as alternative cathode material for lithium ion batteries," Applied Surface Science. 394:25-36 (Feb. 1, 2017) (39 pages).
Schwietert et al., "Clarifying the relationship between redox activity and electrochemical stability in solid electrolytes," Nat Mater. 19:428-435 (Jan. 13, 2020) (34 pages). manuscript.
Su et al., "A more stable lithium anode by mechanical constriction for solid state batteries," Energy Environ Sci. 13:908-916 (Jan. 22, 2020).
Sun et al., "Oxygen substitution effects in Li$_{10}$GeP$_2$S$_{12}$ solid electrolyte," Journal of Power Sources. 324:798-803 (Aug. 30, 2016).
Takada, Kazunor, "Progress and prospective of solid-state lithium batteries," Acta Materialia. 61(3):759-770 (Feb. 2013).
Tan et al., "Carbon-free high-loading silicon anodes enabled by sulfide solid electrolytes," Science. 373(6562):1494-1499 (Sep. 24, 2021) (6 pages).
Tarascon et al., "Issues and challenges facing rechargeable lithium batteries," Nature. 414(6861):359-67 (Nov. 15, 2001).
Tatsumisago et al., "New lithium ion conducting glass-ceramics prepared from mechanochemical Li$_2$S-P$_2$S$_5$ glasses," Solid State Ionics. 154-155:635-640 (Dec. 2, 2002).
Tian et al., "Compatibility issues between electrodes and electrolytes in solid-state batteries," Energy Environ Sci. 10:1150-1166 (Apr. 26, 2017).
Tu et al., "Electrodeposition and Mechanical Stability at Lithium-Solid Electrolyte Interface during Plating in Solid-State Batteries," Cell Reports Physical Science. 1(7):100106 (Jul. 22, 2020) (20 pages).
Wang et al., "A Two-Parameter Space to Tune Solid Electrolytes for Lithium Dendrite Constriction," J. Am. Chem. Soc. 2(4):886-897 (Mar. 2022) (12 pages).
Wang et al., "Computational Prediction and Evaluation of Solid-State Sodium Superionic Conductors Na$_7$P$_3$X$_{11}$ (X=O, S, Se)," Chem Mater. 29(17):7475-7482 (Jul. 27, 2017).
Wang et al., "Lithium Chlorides and Bromides as Promising Solid-State Chemistries for Fast Ion Conductors with Good Electrochemical Stability," Angew Chemie—Int Ed. 58:8039-8043 (Apr. 11, 2019) (7 pages). manuscript.
Wang et al., "Stabilizing interface between Li$_{10}$SnP$_2$S$_{12}$ and Li metal by molecular layer deposition," Nano Energy. 53:168-174 (Aug. 21, 2018).
Wang et al., "Study of lithium diffusivity in amorphous silicon via finite element analysis," J. Power Sources 307:77-85 (Mar. 1, 2016) (35 pages).
Wenzel et al., "Direct Observation of the Interfacial Instability of the Fast Ionic Conductor Li$_{10}$GeP$_2$S$_{12}$ at the Lithium Metal Anode," Chem Mater. 28(7):2400-2407 (Mar. 10, 2016).
Wenzel et al., "Interfacial reactivity and interphase growth of argyrodite solid electrolytes at lithium metal electrodes," Solid State Ionics. 318:102-112 (May 2018).
Wenzel et al., "Interphase formation and degradation of charge transfer kinetics between a lithium metal anode and highly crystalline Li$_7$P$_3$S$_{11}$ solid electrolyte," Solid State Ionics. 286:24-33 (Mar. 2016).
Winter et al., "What are batteries, fuel cells, and supercapacitors?" Chem Rev. 104(10):4245-69 (2010).
Witvrouw et al., "Viscosity and elastic constants of amorphous Si and Ge," J. Appl. Phys. 74(12):7154-7161 (Aug. 26, 1993) (8 pages).
Wu et al., "Advanced sulfide solid electrolyte by core-shell structural design," Nat Commun. 9(1):4037 (Oct. 2, 2018) (11 pages).
Wu et al., "Designing nanostructured Si anodes for high energy lithium ion batteries" Nano Today 7(5):414-429 (Aug. 17, 2012) (16 pages).
Wu et al., "Mechanical modeling of particles with active core-shell structures for lithium-ion battery electrodes," J Phys Chem. 121(35):19022-19030 (2017) (15 pages).
Xin et al., "Li—Nb—O Coating/Substitution Enhances the Electrochemical Performance of the LiNi$_{0.8Mn0.1}$Co$_{0.1}$O$_2$ (NMC 811) Cathode," ACS Appl Mater Interfaces. 11(38):34889-34894 (Aug. 30, 2019).
Xu et al., "Bulk Fatigue Induced by Surface Reconstruction in Layered Ni-Rich Oxide Cathodes for Li-ion Batteries," Nat Mater. DOI:10.1038/s41563-020-0767-8 (Mar. 11, 2020) (51 pages).
Xu et al., "In Situ Generated Fireproof Gel Polymer Electrolyte with Li6.4Ga0.2La3Zr2O12 as Initiator and Ion-Conductive Filler," Adv Energy Mater. 9:1-12 (May 3, 2019).
Yamauchi et al., "Preparation and ionic conductivities of (100-x)(0.75Li$_2$S•0.25P$_2$S$_5$)•xLiBH4 glass electrolytes," J Power Sci. 244:707-710 (Dec. 15, 2013).
Yan et al., "Selective deposition and stable encapsulation of lithium through heterogeneous seeded growth," Nat. Energy 1:16010 (Feb. 22, 2016) (8 pages).
Ye et al., "A dynamic stability design strategy for lithium metal solid state batteries," Nature. 593:218-222 (May 12, 2021) (7 pages).
Ye et al., "An Efficient Route to Polymeric Electrolyte Membranes with Interparticle Chain Microstructure Toward High-Temperature Lithium-Ion Batteries," Adv Mater Interfaces. 4(11):1601236 (Apr. 13, 2017) (6 pages).
Ye et al., "Toward Higher Voltage Solid-State Batteries by Metastability and Kinetic Stability Design," Adv Energy Mater. 10(34):2001569 (Jul. 29, 2020) (15 pages).
Yoshimura et al., "Measurement of the diffusion rate of Li in silicon by the use of bipolar cells" J. Power Sources. 174(2): 653-657 (2007).
Yoshinari et al., "Interfacial Stability of Phosphate-Nasicon Solid Electrolytes in Ni-Rich NCM Cathode-Based Solid-State Batteries," ACS Appl Mater Interfaces. 11(26):23244-23253 (Jun. 14, 2019).
Zhang et al., "Effects of CuO on the microstructure and electrochemical properties of garnet-type Li$_{6.3}$La$_3$Zr$_{1.65}$W$_{0.35}$O$_{12}$ solid electrolyte," J Phys Chem Solids. 135:109080 (Dec. 2019) (6 pages).
Zhang et al., "Mechanisms and properties of ion-transport in inorganic solid electrolytes," Energy Storage Materials. 10:139-159 (Jan. 2018).
Zhang et al., "Unraveling the Intra and Intercycle Interfacial Evolution of Li$_6$PS$_5$Cl-Based All-Solid-State Lithium Batteries," Adv Energy Mater. 10(4):1903311 (Dec. 10, 2019) (12 pages).
Zhao et al., "Ultrastable Anode Interface Achieved by Fluorinating Electrolytes for All-Solid-State Li Metal Batteries," ACS Energy Lett. 5(4):1035-1043 (Mar. 5, 2020).
Zhu et al., "Atomistic calculation of elastic moduli in strained silicon," Semicond. Sci. Technol. 21(7):906-911 (Jun. 5, 2006) (6 pages).
Zhu et al., "First principles study on electrochemical and chemical stability of solid electrolyte-electrode interfaces in all-solid-state Li-ion batteries," J Mater Chem. 4:3253-3266 (Dec. 11, 2015) (34 pages) manuscript.
Zhu et al., "Origin of Outstanding Stability in the Lithium Solid Electrolyte Materials: Insights from Thermodynamic Analyses Based on First-Principles Calculations," ACS Appl Mater Interfaces. 7(42):23685-23693 (Oct. 6, 2015).
Zhu et al., "Strategies Based on Nitride Materials Chemistry to Stabilize Li Metal Anode," Adv Sci. 4(8):1600517 (Mar. 3, 2017) (11 pages).

\* cited by examiner

DESODIATED SODIUM TRANSITION METAL OXIDES FOR PRIMARY BATTERIES

BACKGROUND OF THE INVENTION

Reducing the costs of battery technology has been an active area of research. Sodium-ion batteries have been attracting increasing attention and are considered to be a low-cost complement or an alternative to lithium-ion batteries due to the natural abundance and low cost of sodium compounds and their precursors. Application of sodium in primary batteries has been limited due to the lack of materials that can effectively and reversibly intercalate sodium ions with minimal degradation.

Thus, there is a need for improved primary batteries incorporating desodiated sodium transition metal oxides with controllable energy storage properties.

SUMMARY OF THE INVENTION

We have developed primary batteries incorporating a desodiated sodium transition metal oxide into a positive electrode. The primary batteries disclosed herein are advantageous as the desodiated sodium transition metal oxides provide comparable electrical performance to current Li ion technology at lower cost due to the high abundance of the precursor materials.

In one aspect, the invention features a primary battery including a negative electrode, a positive electrode including a desodiated sodium transition metal oxide of the formula $Na_xMO_2$, and an electrolyte. In the desodiated sodium transition metal oxide, $0<x<1.5$, and M is one or more transition metal atoms.

In some embodiments, the one or more transition metal atoms are selected from the group consisting of Ni, Co, Fe, Mn, Rh, Pt, Cu, Mo, W, Ti, and a combination thereof, e.g., Ni, Co, Fe, Mn, Rh, Pt, Cu, Mo, W, and a combination thereof. In particular embodiments, the one or more transition metal atoms are selected from the group consisting of Ni, Co, Fe, Mn, and a combination thereof. In particular embodiments, the Fe content is 0.2-0.4, e.g., 0.2-0.3. In further embodiments, the desodiated sodium transition metal oxide include an alkali metal or alkaline earth metal atom, e.g., Li or Mg.

In some embodiments, the negative electrode includes elemental zinc. In further embodiments, the negative electrode includes zinc oxide. In some embodiments, the electrolyte includes 1 M to 9M hydroxide. In further embodiments, the electrolyte includes zinc oxide.

In some embodiments, the desodiated sodium transition metal oxide is desodiated from $NaNiO_2$, $NaCoO_2$, $NaFeO_2$, $NaMnO_2$, $Na_{0.67}MnO_2$, $NaFe_{0.24}Ni_{0.76}O_2$, $NaFe_{0.35}Ni_{0.65}O_2$, $NaFe_{0.5}Ni_{0.5}O_2$, $NaFe_{0.5}Co_{0.5}O_2$, $Na_{0.67}Fe_{0.5}Mn_{0.5}O_2$, $NaFe_{0.4}Mn_{0.2}Ni_{0.2}O_2$, $NaFe_yMn_{1-y}O_2$ ($0.05 \leq y \leq 0.5$), $Na_{0.67}Ni_{1/3}Mn_{2/3}O_2$, $NaFe_{1/3}Ni_{1/3}Mn_{1/3}O_2$, $Na_{0.67}Mg_{0.28}Mn_{0.72}O_2$, $Na_{0.67}Mg_{0.205}Fe_{0.05}Ni_{0.1}Mn_{0.645}O_2$, $Na_{0.67}Mg_{0.23}Ni_{0.05}Mn_{0.72}O_2$, $Na_{0.67}Mg_{0.28}Ni_{0.05}Mn_{0.67}O_2$, $Na_{0.67}Mg_{0.205}Ni_{0.125}Mn_{0.67}O_2$, $Na_{0.67}Mg_{0.205}Fe_{0.05}Mn_{0.745}O_2$, $Na_{0.67}Mg_{0.28}Fe_{0.1}Mn_{0.62}O_2$, $Na_{0.67}Mg_{0.24}Fe_{0.18}Mn_{0.58}O_2$, $Na_{0.67}Mg_{0.205}Fe_{0.05}Co_{0.05}Mn_{0.645}O_2$, $Na_{0.7}Ni_{1.1}O_2$, $Na_{0.55}Ni_{1.15}O_2$, $Na_{0.75}Li_{0.1}Ni_{0.15}(Fe_{0.35}Ni_{0.65})_{0.9}O_2$, $Na_{0.6}Li_{0.1}Ni_{0.2}(Fe_{0.35}Ni_{0.65})_{0.9}O_2$, $Na_xFe_{0.35}Ni_{0.75}O_2$ ($0.6 \leq x \leq 0.9$), or $Na_xFe_yNi_zO_2$, ($0.5 \leq x \leq 1$, $0 \leq y \leq 0.5$, $1 \leq z \leq 1.3$). In some embodiments, the desodiated sodium transition metal oxide is one or more of compositions 1-26, 29-53, 56, and 57 of Table 1 as described herein. In certain embodiments, the desodiated sodium transition metal oxide is one or more of compositions 2, 16, 17, 26, 37, 38, 44, and 45 of Table 1 as described herein.

In some embodiments the desodiated sodium transition metal oxide is $Na_{0.24}H_{0.76}Fe_{0.35}Ni_{0.65}O_2$.

In some embodiments, the desodiated sodium transition metal oxide has stoichiometric ratio of intercalated protons to transition metal of about 0.5 to 1.67 H per M, e.g., 0.75 to 1 H per M.

In another aspect, the invention features a method of synthesizing a sodium transition metal oxide of the formula $Na_xMO_2$. The method includes mixing together a sodium source and a transition metal oxide, where the sodium source contains at least two sodium atoms, heating the mixture to form a sodium transition metal oxide, and de-intercalating sodium from the sodium transition metal oxide such that $0<x<1.5$. M in the formula $Na_xMO_2$ is one or more transition metal atoms.

In some embodiments, the sodium source is $Na_2O_2$ or $Na_2CO_3$. In some embodiments, the de-intercalating of the sodium from the sodium transition metal oxide occurs electrochemically. In other embodiments, the de-intercalating of the sodium from the sodium transition metal oxide occurs chemically.

In some embodiments, the one or more transition metal atoms are selected from the group consisting of Ni, Co, Fe, Mn, Rh, Pt, Cu, Mo, W, and a combination thereof. In particular embodiments, the one or more transition metal atoms are selected from the group consisting of Ni, Co, Fe, Mn, and a combination thereof.

In some embodiments, the sodium transition metal oxide is $NaNiO_2$, $NaCoO_2$, $NaFeO_2$, $NaMnO_2$, $Na_{0.67}MnO_2$, $NaFe_{0.24}Ni_{0.76}O_2$, $NaFe_{0.35}Ni_{0.65}O_2$, $NaFe_{0.5}Ni_{0.5}O_2$, $NaFe_{0.5}Co_{0.5}O_2$, $Na_{0.67}Fe_{0.5}Mn_{0.5}O_2$, $NaFe_{0.4}Mn_{0.2}Ni_{0.2}O_2$, $NaFe_yMn_{1-y}O_2$ ($0.05 \leq y \leq 0.5$), $Na_{0.67}Ni_{1/3}Mn_{2/3}O_2$, $NaFe_{1/3}Ni_{1/3}Mn_{1/3}O_2$, $Na_{0.67}Mg_{0.28}Mn_{0.72}O_2$, $Na_{0.67}Mg_{0.205}Fe_{0.05}Ni_{0.1}Mn_{0.645}O_2$, $Na_{0.67}Mg_{0.23}Ni_{0.05}Mn_{0.72}O_2$, $Na_{0.67}Mg_{0.28}Ni_{0.05}Mn_{0.67}O_2$, $Na_{0.67}Mg_{0.205}Ni_{0.125}Mn_{0.67}O_2$, $Na_{0.67}Mg_{0.205}Fe_{0.05}Mn_{0.745}O_2$, $Na_{0.67}Mg_{0.28}Fe_{0.1}Mn_{0.62}O_2$, $Na_{0.67}Mg_{0.24}Fe_{0.18}Mn_{0.58}O_2$, $Na_{0.67}Mg_{0.205}Fe_{0.05}Co_{0.05}Mn_{0.645}O_2$, $Na_{0.7}Ni_{1.1}O_2$, $Na_{0.55}Ni_{1.15}O_2$, $Na_{0.75}Li_{0.1}Ni_{0.15}(Fe_{0.35}Ni_{0.65})_{0.9}O_2$, $Na_{0.6}Li_{0.1}Ni_{0.2}(Fe_{0.35}Ni_{0.65})_{0.9}O_2$, $Na_xFe_{0.35}Ni_{0.75}O_2$ ($0.6 \leq x \leq 0.9$), or $Na_xFe_yNi_zO_2$, ($0.5 \leq x \leq 1$, $0 \leq y \leq 0.5$, $1 \leq z \leq 1.3$).

As used herein, the term "about" refers to +/-10% of a recited value.

BRIEF DESCRIPTION OF THE DRAWINGS

FIGS. 2B-2C show X-ray absorption near edge spectra of: FIG. 2B Fe; and FIG. 2C Ni. Showing Fe and Ni reduction.

FIGS. 2D-2E show Fourier transform magnitudes of Extended X-ray Absorption Fine Structure of: FIG. 2D Fe; and FIG. 2E Ni. Showing the bond length change.

FIGS. 3A-3B show the water intercalated structure before (FIG. 3A) and after (FIG. 3B) DFT relaxation, showing the water splitting. FIG. 3C shows water intercalation induced interlayer distance increase. FIG. 3D shows the fully discharged structure with migrated TM.

DETAILED DESCRIPTION OF THE INVENTION

Figure 1A:
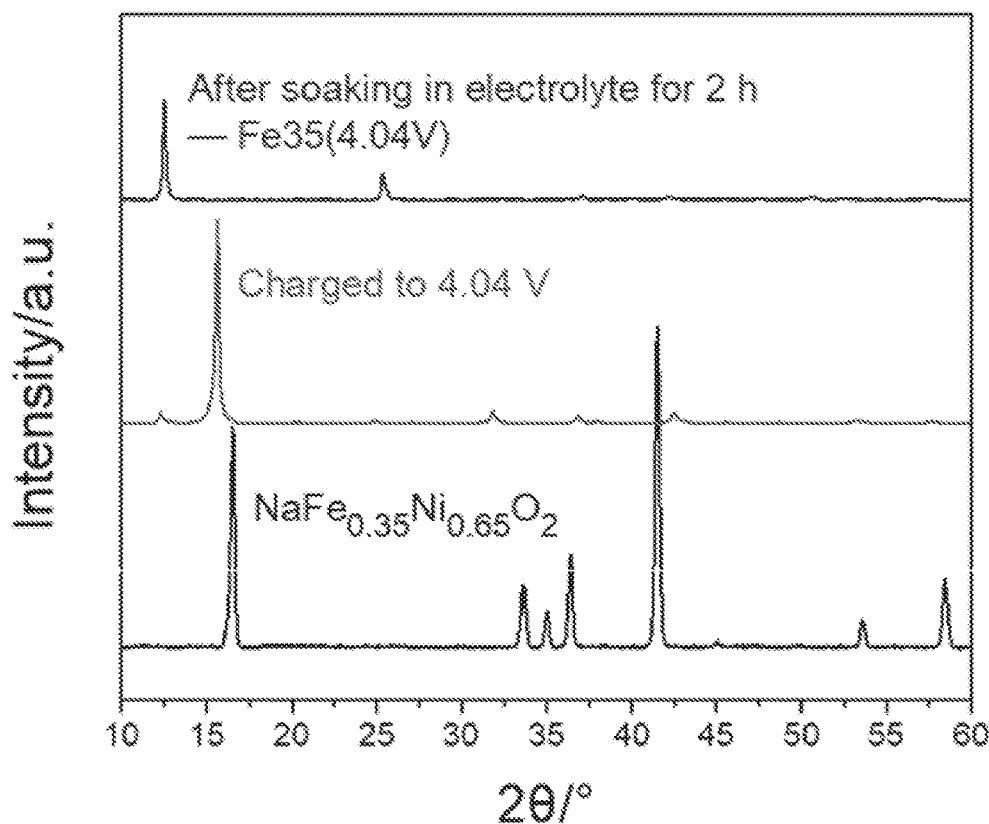
FIG. 1A shows the X-ray diffraction (XRD) pattern of pristine $NaFe_{0.35}Ni_{0.65}O_2$ (Fe35) powder (Top), charged Fe35 film at 4.04V in Na ion battery (Middle) and subsequently soaked film of "Fe35(4.04V)" in the primary battery electrolyte (Bottom).

The invention provides primary batteries that incorporate a desodiated sodium transition metal oxide into the positive electrode (a cathode). Batteries of the invention using a desodiated sodium transition metal oxide in the cathode exhibit discharge voltages, battery capacities, and energy densities higher than a traditional Zn—$MnO_2$ dry cell battery, such as a commercially available AA battery. These batteries are also advantageous over comparable lithium ion batteries due to the high abundance and low cost of sodium precursor materials with similar electrical performance.

Desodiated Sodium Transition Metal Oxides

A desodiated sodium transition metal oxide of the invention has the general formula $Na_xMO_2$, where $0<x\leq1.5$. For example, the relative atomic amount of sodium in the desodiated sodium transition metal oxides of the invention may be from greater than 0 to about 1.5, e.g., about 0.05 to about 0.67, about 0.33 to about 1, or about 0.75 to 1.5, e.g., about 0.05, about 0.1, about 0.15, about 0.2, about 0.25, about 0.3, about 0.35, about 0.4, about 0.45, about 0.5, about 0.55, about 0.6, about 0.65, about 0.7, about 0.75, about 0.8, about 0.85, about 0.9, about 0.95, about 1.0, about 1.05, about 1.1, about 1.15, about 1.2, about 1.25, about 1.3, about 1.35, about 1.4, about 1.45, or about 1.5.

In the present invention, M is one or more transition metal atoms. Transition metals useful for the desodiated sodium transition metal oxides include, but are not limited to, Ni, Co, Fe, Mn, Rh, Pt, Cu, Mo, W, and combinations thereof. Exemplary transition metals include Ni, Co, Fe, Mn, and combinations thereof. In particular, Fe and Mn are noteworthy due to their higher abundance and substantially lower costs relative to other transition metals. The relative atomic amount of any transition metal in the desodiated sodium transition metal oxides of the invention may be from greater than 0 to about 1, e.g., about 0.01 to about 0.5, about 0.25 to about 0.75, or about 0.5 to 1, e.g., about 0.01, about 0.05, about 0.1, about 0.15, about 0.2, about 0.25, about 0.3, about 0.35, about 0.4, about 0.45, about 0.5, about 0.55, about 0.6, about 0.65, about 0.7, about 0.75, about 0.8, about 0.85, about 0.9, about 0.95, or about 1.0.

In some cases, the desodiated sodium transition metal oxides include additional atoms, such as alkali metals, e.g., Li or K, and/or alkaline earth metals, e.g., Mg, Ca, Ba, or Sr. The relative atomic amount of any alkali metal or alkaline earth metal atom in the desodiated sodium transition metal oxides of the invention may be from greater than 0 to about 1, e.g., about 0.01 to about 0.5, about 0.25 to about 0.75, or about 0.5 to 1, e.g., about 0, about 0.05, about 0.1, about 0.15, about 0.2, about 0.25, about 0.3, about 0.35, about 0.4, about 0.45, about 0.5, about 0.55, about 0.6, about 0.65, about 0.7, about 0.75, about 0.8, about 0.85, about 0.9, about 0.95, or about 1.0.

The desodiated sodium transition metal oxides are typically layered in structure. In the present invention, transition metals may be located in the sodium layer as well as the $MO_2$ layer. Furthermore, additional atoms, such as alkali metals, e.g., Li, or alkaline earth metals, e.g., Mg, may be in the sodium or $MO_2$ layer or both. The electrical performance of desodiated sodium transition metal oxides of the invention that contain approximately 30% Fe, such as $NaFe_{0.24}Ni_{0.76}O_2$ and $NaFe_{0.3}Ni_{0.65}O_2$, may be related to the high voltage rippling phase as described by Chen et al. (Adv. Funct. Mat., 2018, 28(39), 1803896). As described in Chen et al., the rippling phase, where the metal oxide layer is not flat but has a rippled surface, is caused by the collective electronic behavior of the $FeO_6$ octahedra. In contrast, a composition with a 30% Fe content is near the percolation threshold for the $Na^+$ or $H^+$ ions, and these ions always "see" the Fe ions on either side of the sodium layer.

Batteries

Desodiated sodium transition metal oxides of the present invention may be used to form an electrode, e.g., a cathode, of a primary battery.

An exemplary primary battery of the invention includes a positive terminal, cathode, separator, electrolyte, anode, and negative terminal. A positive terminal is in electrical contact with the cathode, and a negative terminal is in electrical contact with the anode. Contact between a negative terminal and anode may be direct; alternatively, the contact between the negative terminal and the anode may occur through an intervening conductor, such as a pickup conductor. The separator is between the cathode and the anode. Exemplary materials for separators are nonwoven fibers (cotton, nylon, polyesters, glass), polymer films (polyethylene, polypropylene, poly (tetrafluoroethylene), polyvinyl chloride), ceramics, and naturally occurring substances (rubber, asbestos, cellulose). The primary battery of the invention may further include an outer housing to contain all of the necessary components of the cell. In particular examples, the primary battery of the invention may take the physical form of a commercial alkaline battery, e.g., AAA, AA, C, D, or 9V. Other suitable physical forms of primary batteries are known in the art.

Electrode Materials

The desodiated sodium transition metal oxides may be a solid piece of the material, or alternatively, may be deposited onto or mixed with an appropriate substrate, e.g., a fluoropolymer or carbon. For example, dry polytetrafluoroethylene (PTFE) and wet polyvinylidene fluoride (PVDF) have been used as binders when making electrode materials for incorporation into an electrochemical cell. Other binders are known in the art. Materials for use as anodes in a primary battery of the present invention include metals, e.g., Zn. The metal may be in any suitable form, such as a powder or paste to be deposited onto or mixed with a substrate, a foil, or a mesh. For either positive or negative electrodes, the electrode material can be used without any additives. Alternatively, the electrode material may have additives to enhance its physical and/or ion/electron conducting properties. For example, cathodes may have an additive (such as carbon) that modifies the surface area exposed to the electrolyte. As another example, anodes may have an additive that enhances electron conductivity, such as an oxide, e.g., ZnO. Other additives are known in the art.

In one embodiment of a primary battery of the invention, the cathode includes a desodiated sodium transition metal oxide, PTFE, and carbon black, and the anode includes Zn and ZnO.

Electrolytes

Suitable electrolytes for primary batteries include aqueous solutions of alkali hydroxides, e.g., KOH, LiOH or NaOH, any may be a combination of one or more alkali hydroxides. The concentration of the alkali hydroxides in the electrolyte may be from about 1 M to about 9M, e.g., from about 1 M to about 4M, from about 2M to about 5M, from about 3M to about 6M, from about 4M to about 7M, from about 5M to about 8M, or from about 6M to about 9M, e.g., about 1 M, about 2M, about 3M, about 4M, about 5M, about 6M, about 7M, about 8M, or about 9M. Electrolytes may be used without any additives. Alternatively, the electrolytes may have additives. Electrolyte additives may be included to stabilize electrode-electrolyte interfaces and/or increase the voltage stability windows of the electrolyte. For example, electrolytes may include alkali salts, e.g., $K_2CO_3$, KF, other alkaline hydroxides, e.g., LiOH, or transition metal compounds, e.g., ZnO. Other additives are known in the art.

Batteries of the invention may be employed in methods of providing power to an electrical device. The battery (or a series of batteries) is electrically connected to the electrical device in an electrical circuit, which may include an on/off switch or other controller to interrupt or complete the circuit as desired.

Methods of Synthesis

The invention features methods of synthesizing a desodiated sodium transition metal oxide of the formula $Na_xMO_2$. The method involves mixing together a sodium source and a transition metal oxide, with the sodium source containing at least two sodium atoms. This mixture is then heated via a furnace to produce a sodium transition metal oxide. The resulting sodium transition metal oxide is then de-intercalated to remove sodium such that $0<x\leq1.5$. The M of the general formula $Na_xMO_2$ may include one or more transition metal atoms, such as Ni, Co, Fe, Mn, Rh, Pt, Cu, Mo, W, or a combination thereof. Exemplary transition metals include Ni, Co, Fe, Mn, or a combination thereof. The transition metal oxide may further include additional metal atoms, such as alkali metals, e.g., Li, or alkaline earth metals, e.g., Mg.

Suitable sodium sources of the desodiated sodium transition metal oxides include any precursor that includes at least two sodium atoms in its chemical formula. Exemplary sodium sources include sodium salts, e.g., $Na_2CO_3$, or sodium bases, e.g., $Na_2O_2$.

When present, useful alkali metals include Li and K, and useful alkaline earth metals include Mg, Ca, Ba, or Sr. The precursor of the alkali or alkaline earth metal atoms generally include salts of any counterion (e.g., $Cl^-$, $NO_3^-$, or $SO_4^{2-}$). For example, precursors for the incorporation of Mg into sodium transition metal oxides include, but are not limited to, MgO, $Mg(OH)_2$, $MgCl_2$, $Mg(NO_3)_2$, $MgSO_4$, and $MgCO_3$.

To form the sodium transition metal oxides from the mixture, the mixture is heated using methods known in the art. The temperatures used to form the solid state electrolyte may be from about 650° C. to about 950° C. (e.g., about 650° C. to about 750° C., about 700° C. to about 800° C., about 750° C. to about 850° C., about 800° C. to about 850° C., or about 850° C. to about 950° C., e.g., about 650° C., about 660° C., about 670° C., about 680° C., about 690° C., about 700° C., about 710° C., about 720° C., about 730° C., about 740° C., about 750° C., about 760° C., about 770° C., about 780° C., about 790° C., about 800° C., about 810° C., about 820° C., about 830° C., about 840° C., about 850° C., about 860° C., about 870° C., about 880° C., about 890° C., about 900° C., about 910° C., about 920° C., about 930° C., about 940° C., or about 950° C.). The heating process can be done in the presence of air, a reactive gas (e.g., 02), or under vacuum. The resulting sodium transition metal oxide is then cooled back to room temperature or quenched using methods known in the art.

De-intercalation of sodium in desodiated sodium transition metal oxides of the present invention may be achieved by electrochemical treatment or chemical treatment. In an electrochemical treatment, a synthesized sodium transition metal oxide may be used as a cathode material in an electrochemical cell with an alkali metal, e.g., sodium metal, as the anode and a sodium salt, e.g., $NaPF_6$ or $NaClO_4$, dissolved in an appropriate solvent, e.g., ethylene carbonate, diethyl carbonate, or fluoroethylene carbonate, or a mixture thereof, as the electrolyte. In a chemical treatment for de-intercalation, the synthesized sodium transition metal oxides may be simultaneously oxidized and de-intercalated by being contacted with a solution of a halogen, e.g., $Cl_2$, $Br_2$, or $I_2$, dissolved in an appropriate solvent, e.g., a polar aprotic solvent, e.g., acetonitrile, ethyl acetate, or dimethylformamide. Heat treatment of the solution above room temperature, such as heating to 40° C., 50° C., or 60° C., can speed up the chemical de-intercalation process.

One method of electrochemical preparation of the desodiated transition metal oxides in the present invention involves charging sodium transition metal oxide to between 3.90V and 4.50V in a Na half cell, e.g., between about 3.90V and about 4.40V, between about 3.90V and about 4.30V, between about 3.90V and about 4.20V, between about 3.90V and about 4.10V, or between about 3.95V and about 4.05V, e.g., about 4.04V. The cathode is then then washed with water to obtain the product.

In a particular embodiment of the method above, the sodium transition metal oxide to be desodiated is $NaFe_{0.35}Ni_{0.65}O_2$. In some embodiments the resulting desodiated sodium transition metal oxide is $Na_{0.24}H_{0.76}Fe_{0.35}Ni_{0.65}O_2$.

EXAMPLES

Example 1—Synthesis of Sodium Transition Metal Oxides

Sodium transition metal oxides of the present invention were synthesized using solid state reaction methods by mixing either $Na_2O_2$ or $Na_2CO_3$ with the transition metal oxides. The mixed precursor materials were pressed into a pellet. The pellet was then heated in a tube furnace between 650-950° C. for approximately 10-12 hours in an air or oxygen atmosphere. The choice to use air or oxygen for the heating process was based on the specific compound desired. The heated pellets were quenched or slowly cooled down after the heating process.

Example 2—De-Intercalation of Sodium in Synthesized Sodium Transition Metal Oxides For the electrochemical de-intercalation method, the cathode film of the electrochemical cell was made by mixing powdered as-synthesized sodium transition metal oxides, Super P carbon black, and dry PTFE. A Swagelok battery was assembled using glass fiber as a separator, sodium metal as the anode, and 1 M $NaPF_6$ or $NaClO_4$ in EC/DEC/FEC as the electrolyte. The charging process was applied with the high cutoff voltage ranging from 3.9 V to 4.5 V according to the specific sodium composition (x) needed to be left in $Na_xMO_2$.

For the chemical de-intercalation method, an iodine ($I_2$)-acetonitrile solution was used to oxidize a pristine powder of the as-synthesized sodium transition metal oxides and extract sodium simultaneously. For sodium transition metal oxides that have higher sodium atomic content, and thus correspond to a low voltage during electrochemical charging, one sodium ion can be extracted by ½ $I_2$. For sodium transition metal oxides that have lower sodium atomic content, and thus correspond to a higher voltage during electrochemical charging, more than ½ $I_2$ is needed to extract 1 $Na^+$ due to reaction equilibrium limitation.

Example 3—Desodiated Sodium Transition Metal Oxides in Primary Batteries

Proton intercalation was performed in a Swagelok battery connected to a Landt battery test station. For electrical testing, the discharge performance of all synthesized materials was measured at a rate of 1/30 C with a cut-off voltage of 0.2 V.

The cathode active material was the $Na_xMO_2$ material after de-intercalation of Na as described in Example 2. The cathode film had a mass ratio of 80:15:5 for active cathode material, carbon black and PTFE. The anode was a strip of Zn foil 0.25 mm thick. For most of the synthesized compounds studied, the electrolyte was an aqueous solution of 9 M KOH with 0.6 M ZnO. For the particular compound $Na_{0.24}Fe_{0.35}Ni_{0.65}O_2$, the electrolyte was an aqueous solution of 3.2 M LiOH with 0.8 M KOH. Glass fiber was used as separator.

Table 1 provides a list of exemplary desodiated sodium transition metal oxides of the present invention and their electrochemical characterization with comparisons to commercially available conventional $MnO_2$ and AA-sized alkaline batteries.

TABLE 1

Chemical formulas and electrochemical characterization of desodiated sodium transition metal oxides $Na_xMO_2$ of the present invention.

| Base Material | Composition # | Na atom composition (x) | Avg. Discharge Voltage (V) | Capacity (mAh/g) | Energy Density (Wh/kg) |
|---|---|---|---|---|---|
| $NaNiO_2$ | 1 | 0.4 | 1.6 | 132 | 211 |
|  | 2 | 0.29 | 1.6 | 171 | 274 |
|  | 3 | 0.24 | 1.6 | 119 | 190 |
| $NaCoO_2$ | 4 | 0.38 | 1 | 146 | 146 |
|  | 5 | 0.25 | 0.9 | 226 | 203 |
| $NaFeO_2$ | 6 | 0.79 | 0.6 | 191 | 115 |
|  | 7 | 0.50 | 0.6 | 194 | 116 |
| $NaMnO_2$ | 8 | 0.20 | 1 | 211 | 211 |
|  | 9 | 0.12 | 1.1 | 153 | 168 |
| $Na_{0.67}MnO_2$ | 10 | 0.15 | 0.8 | 100 | 80 |
|  | 11 | 0.25 | 0.8 | 193 | 154 |
|  | 12 | 0.40 | 0.8 | 144 | 115 |
| $NaFe_{0.24}Ni_{0.76}O_2$ | 13 | 0.34 | 1.6 | 125 | 200 |
|  | 14 | 0.25 | 1.6 | 120 | 192 |
|  | 15 | 0.13 | 1.6 | 111 | 178 |
| $NaFe_{0.35}Ni_{0.65}O_2$ | 16 | 0.33 | 1.6 | 167 | 267 |
|  | 17 | 0.24 | 1.6 | 208 | 333 |
|  | 18 | 0.05 | 1.6 | 113 | 181 |
| $NaFe_{0.5}Ni_{0.5}O_2$ | 19 | 0.45 | 1.3 | 56 | 73 |
|  | 20 | 0.35 | 1.6 | 102 | 163 |
|  | 21 | 0.25 | 1.6 | 60 | 96 |

TABLE 1-continued

Chemical formulas and electrochemical characterization of desodiated sodium transition metal oxides $Na_xMO_2$ of the present invention.

| Base Material | Composition # | Na atom composition (x) | Avg. Discharge Voltage (V) | Capacity (mAh/g) | Energy Density (Wh/kg) |
|---|---|---|---|---|---|
| $NaFe_{0.5}Co_{0.5}O_2$ | 22 | 0.18 | 1.1 | 156 | 172 |
| | 23 | 0.27 | 1.1 | 131 | 144 |
| $Na_{0.67}Fe_{0.5}Mn_{0.5}O_2$ | 24 | 0.32 | 1 | 136 | 136 |
| | 25 | 0.25 | 0.9 | 177 | 159 |
| | 26 | 0.19 | 0.9 | 200 | 180 |
| $NaFe_{0.4}Mn_{0.2}Ni_{0.2}O_2$ | 27 | — | — | — | — |
| $NaFe_yMn_{1-y}O_2$ ($0.05 \leq y \leq 0.5$) | 28 | — | — | — | — |
| $Na_{0.67}Ni_{1/3}Mn_{2/3}O_2$ | 29 | 0.09 | 0.9 | 235 | 212 |
| $NaFe_{1/3}Ni_{1/3}Mn_{1/3}O_2$ | 30 | 0.36 | 1.4 | 100 | 140 |
| | 31 | 0.23 | 1.3 | 88 | 114 |
| | 32 | 0.17 | 1.3 | 90 | 117 |
| $Na_{0.67}Mg_{0.28}Mn_{0.72}O_2$ | 33 | 0.46 | 1.1 | 84 | 92 |
| | 34 | 0.42 | 1 | 141 | 141 |
| | 35 | 0.39 | 1 | 237 | 237 |
| | 36 | 0.35 | 0.9 | 251 | 226 |
| | 37 | 0.32 | 0.9 | 285 | 257 |
| | 38 | 0.28 | 1 | 289 | 289 |
| | 39 | 0.27 | 0.9 | 240 | 216 |
| | 40 | 0.25 | 1 | 97 | 97 |
| $Na_{0.67}Mg_{0.205}Fe_{0.05}Ni_{0.1}Mn_{0.645}O_2$ | 41 | 0.45 | 0.9 | 113 | 102 |
| | 42 | 0.38 | 0.9 | 125 | 113 |
| | 43 | 0.36 | 0.9 | 163 | 147 |
| | 44 | 0.34 | 0.7 | 314 | 220 |
| | 45 | 0.31 | 0.8 | 328 | 262 |
| $Na_{0.67}Mg_{0.23}Ni_{0.05}Mn_{0.72}O_2$ | 46 | 0.33 | 1.1 | 43 | 47 |
| | 47 | 0.29 | 1.1 | 37 | 41 |
| $Na_{0.67}Mg_{0.28}Ni_{0.05}Mn_{0.67}O_2$ | 48 | 0.35 | 1 | 122 | 122 |
| | 49 | 0.32 | 1 | 108 | 108 |
| $Na_{0.67}Mg_{0.205}Ni_{0.125}Mn_{0.6}O_2$ | 50 | 0.33 | 0.93 | 178 | 166 |
| | 51 | 0.29 | 0.85 | 87 | 74 |
| $Na_{0.67}Mg_{0.205}Fe_{0.05}Mn_{0.745}O_2$ | 52 | 0.33 | 1.1 | 79 | 87 |
| | 53 | 0.29 | 1.1 | 50 | 55 |
| $Na_{0.67}Mg_{0.28}Fe_{0.1}Mn_{0.62}O_2$ | 54 | — | — | — | — |
| $Na_{0.67}Mg_{0.24}Fe_{0.18}Mn_{0.58}O_2$ | 55 | — | — | — | — |
| $Na_{0.67}Mg_{0.205}Fe_{0.05}Co_{0.05}Mn_{0.645}O_2$ | 56 | 0.35 | 1 | 65 | 65 |
| | 57 | 0.32 | 0.9 | 42 | 38 |
| $Na_{0.7}Ni_{1.1}O_2$ | 58 | — | — | — | — |
| $Na_{0.55}Ni_{1.15}O_2$ | 59 | — | — | — | — |
| $Na_{0.75}Li_{0.1}Ni_{0.15}(Fe_{0.35}Ni_{0.65})_{0.9}O_2$ | 60 | — | — | — | — |
| $Na_{0.6}Li_{0.1}Ni_{0.2}(Fe_{0.35}Ni_{0.65})_{0.9}O_2$ | 61 | — | — | — | — |
| $Na_xFe_{0.35}Ni_{0.75}O_2$ ($0.6 \leq x \leq 0.9$) | 62 | — | — | — | — |
| $Na_xFe_yNi_zO_2$ ($0.5 \leq x \leq 1, 0 \leq y \leq 0.5, 1 \leq z \leq 1.3$) | 63 | — | — | — | — |
| CEMD (commercial $MnO_2$) | | — | 1.3 | 105 | 137 |
| A2W (commercial $MnO_2$) | | — | 1.3 | 145 | 189 |
| $MnO_2$ from AA cell | | — | 1.2 | 180 | 216 |

As is seen in Table 1, battery tests using the desodiated sodium transition metal oxides of the present invention in battery setups described herein display battery discharge voltages above 1.6 V and battery capacities above 300 mAh/g. These values are much higher than commercially available $MnO_2$-based AA batteries which typically have discharge voltages around 1.2 to 1.3 V and less than 180 mAh/g capacity (as shown in the bottom of Table 1). In our testing, many of the synthesized desodiated sodium transition metal oxides have energy densities ranging from 257 Wh/kg to 333 Wh/kg, while the commercially available $MnO_2$-based AA batteries have capacities ranging from 137 Wh/kg to 216 Wh/kg. Changes to the testing conditions, such as changes to the electrolyte composition, e.g., adding additives, or the anode material may result in battery capacities and/or energy densities that are up to 2× larger, e.g., 1.2×, 1.6×, or 2× larger, than those specified in Table 1.

Figure 1B:
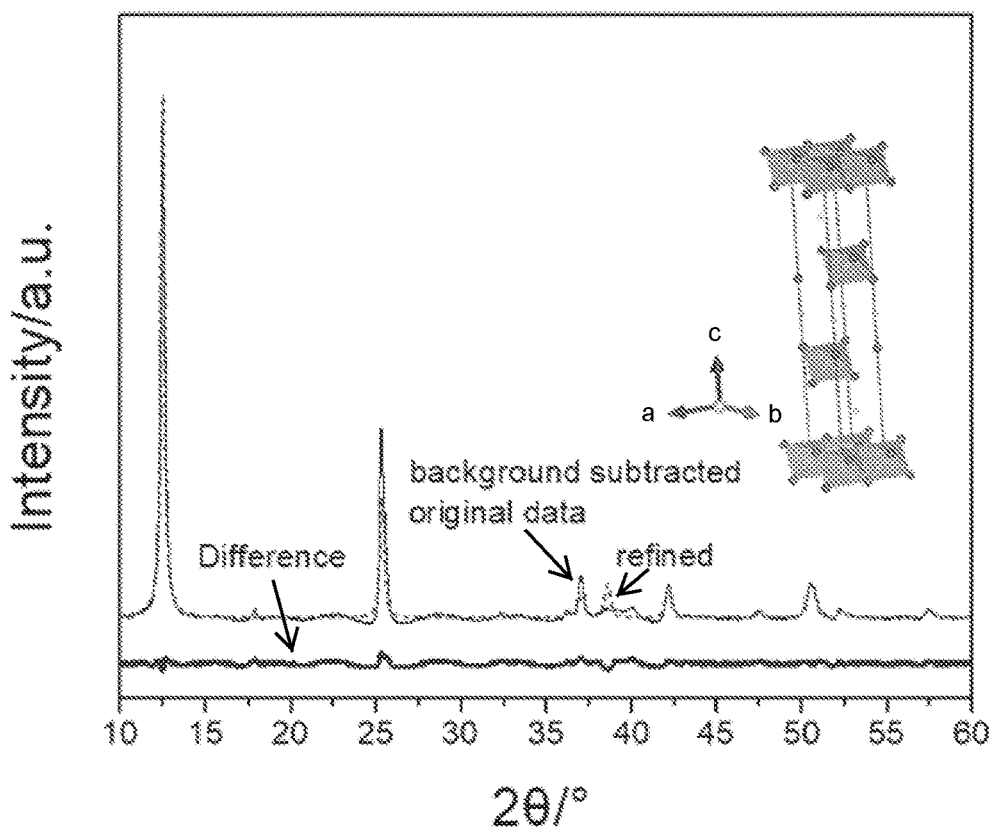
FIG. 1B shows Rietveld refinement of the XRD pattern of the Fe35(4.04V) using a NiOOH structure with large interlayer distance.
Figure 1C:
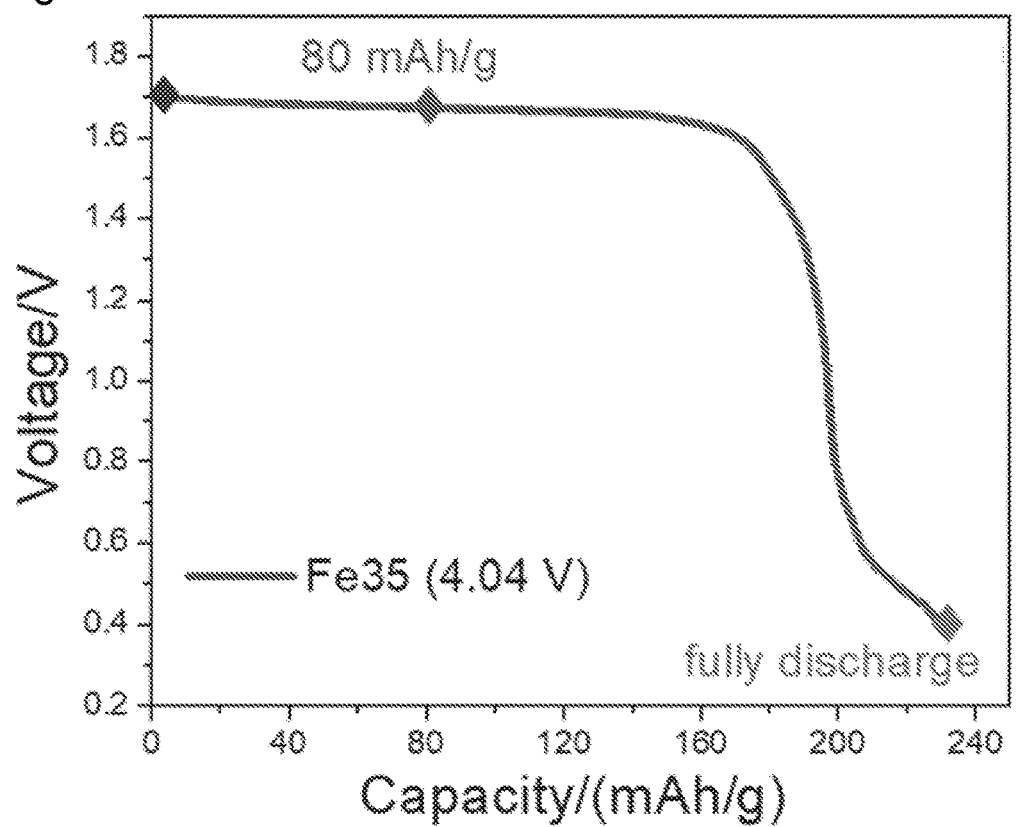
FIG. 1C shows electrochemical discharge voltage curve of Fe35(4.04V) with a large plateau at 1.66V versus Zn anode, with dots indicating the discharge state at which XRD patterns are measured.

Example 4—Sodium Deintercalated Cathode Compounds with Mixed Transition Metals for Primary Battery Applications $NaFe_{0.35}Ni_{0.65}O_2$ (Fe35) was first charged to 4.04V in a Na half cell. The cathode was then washed by water to obtain the Fe35(4.04V) product (FIG. 1A-1B). Fe35(4.04V)

discharged in aqueous electrolytes with the Zn anode offered a capacity of 208 mAh/g at an average voltage of 1.6V (FIG. 1C).

Figure 1D:
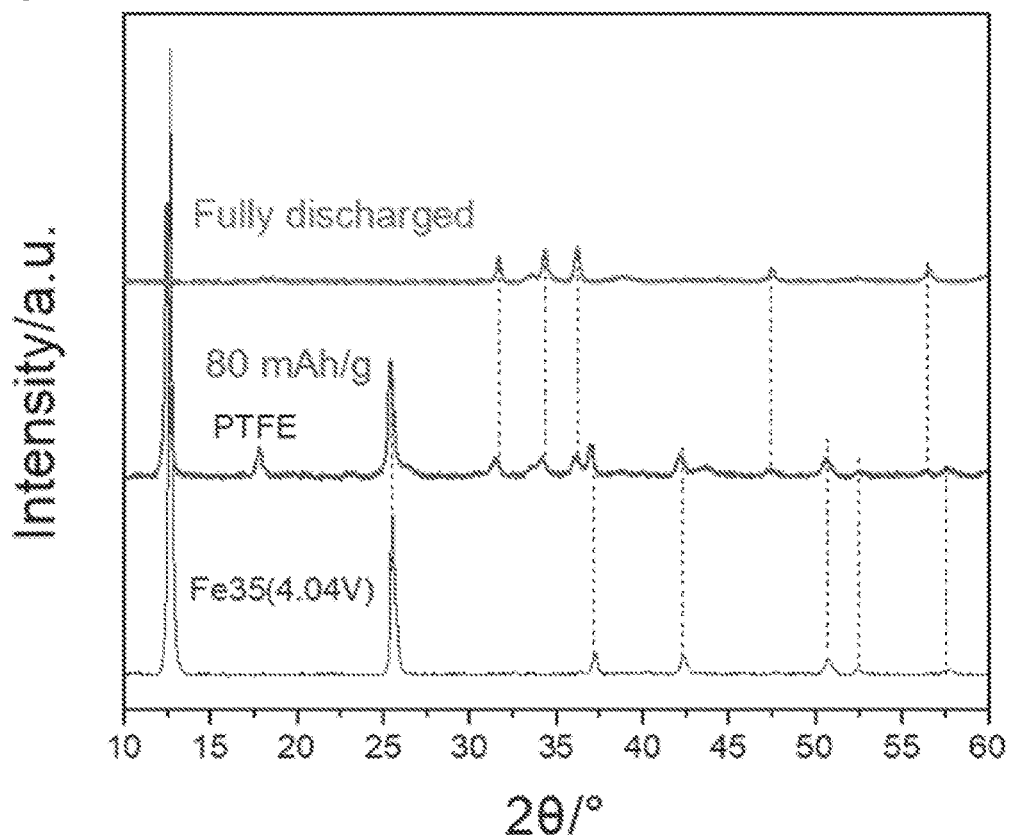
FIG. 1D shows XRD patterns characterizing the structure evolution of Fe35(4.04V) during discharge, the intensity of 80 mAh/g pattern and fully discharged pattern are enlarged twice for a better illustration.
Figure 1E:
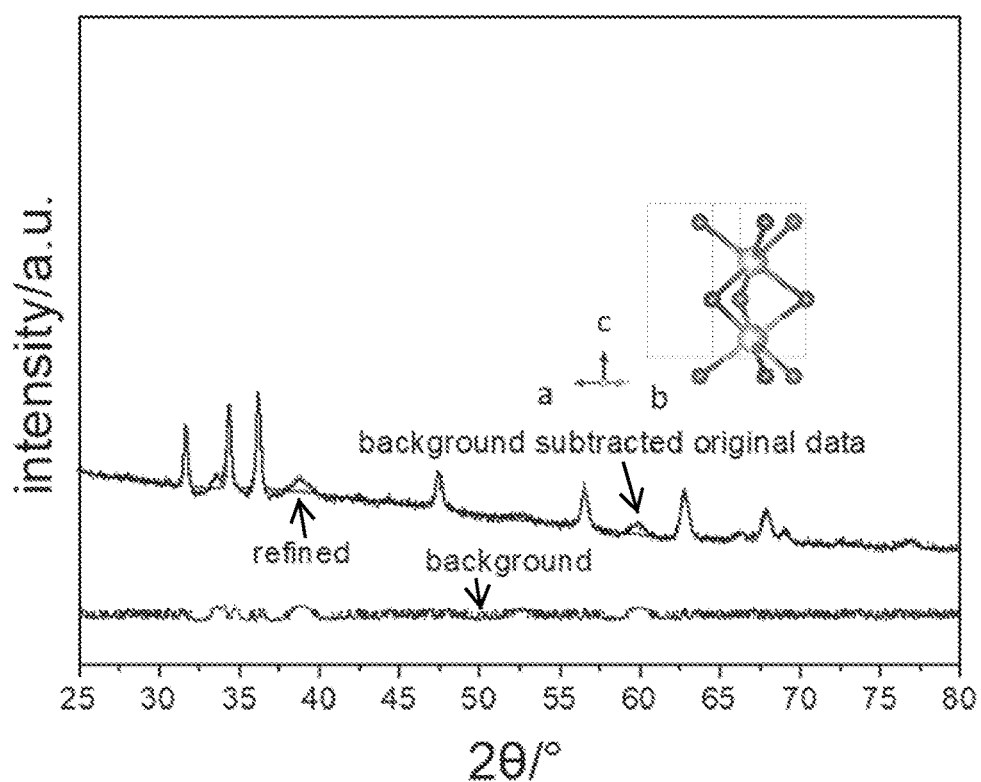
FIG. 1E shows the Rietveld refinement of the XRD pattern of the fully discharged Fe35(4.04V).
Figure 2A:
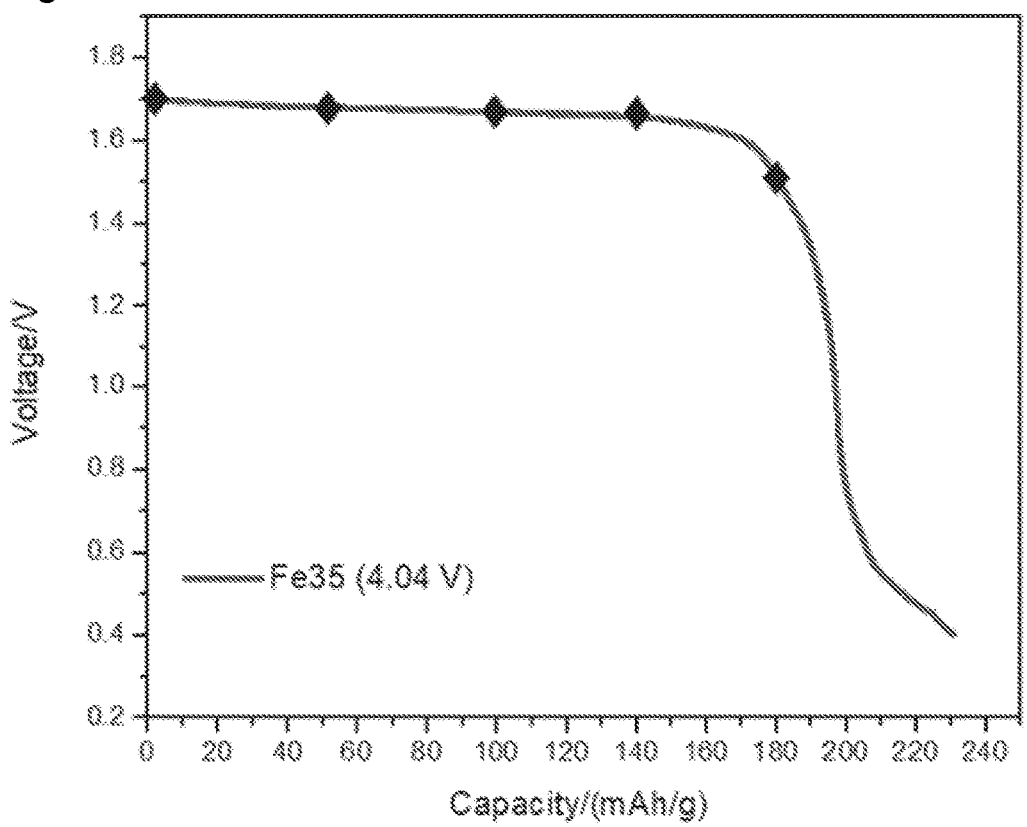
FIG. 2A shows comparisons of x-ray absorption spectra of Fe35(4.04V) at different capacity state on the plateau as indicated by the diamond markers.
Figure 2B:
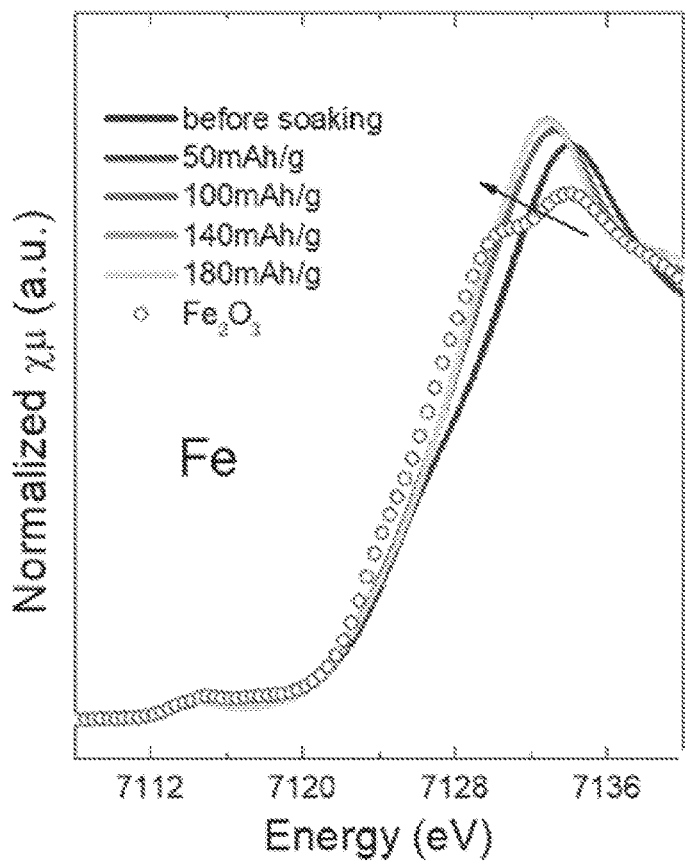
Figure 2C:
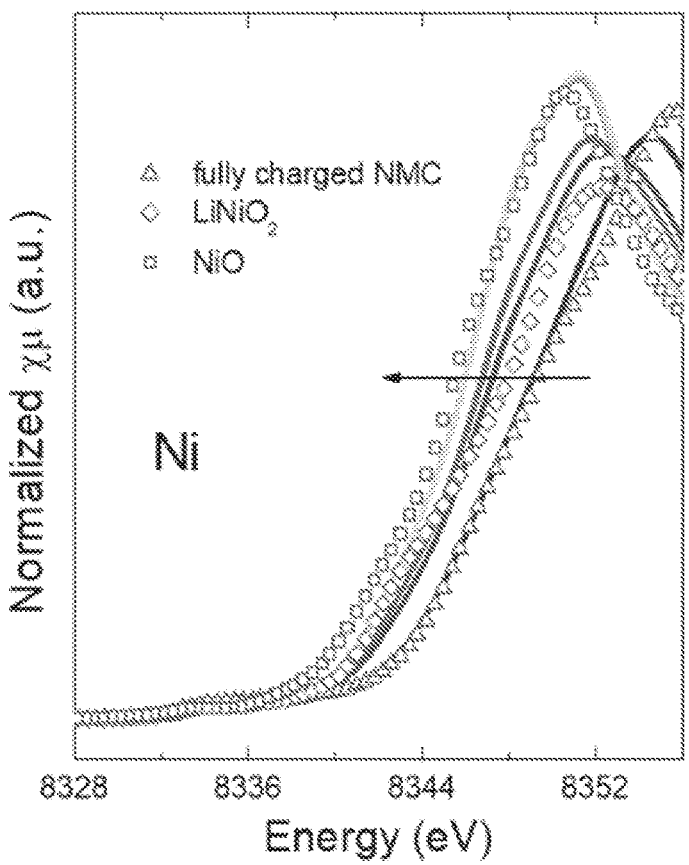
Figure 2D:
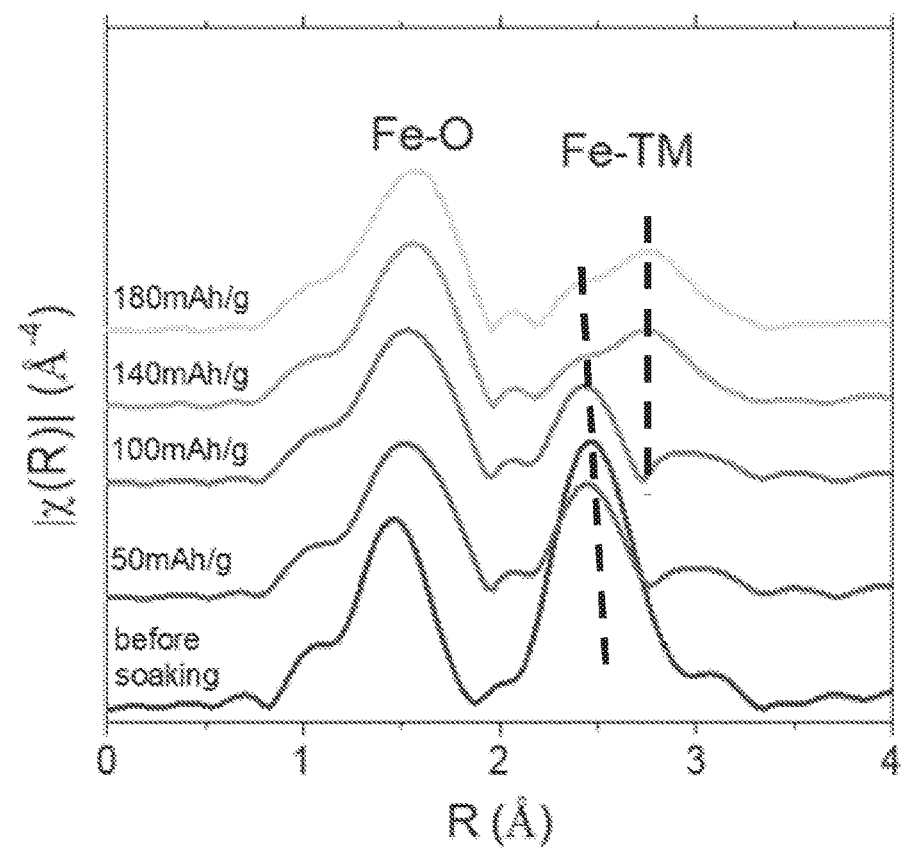
Figure 2E:
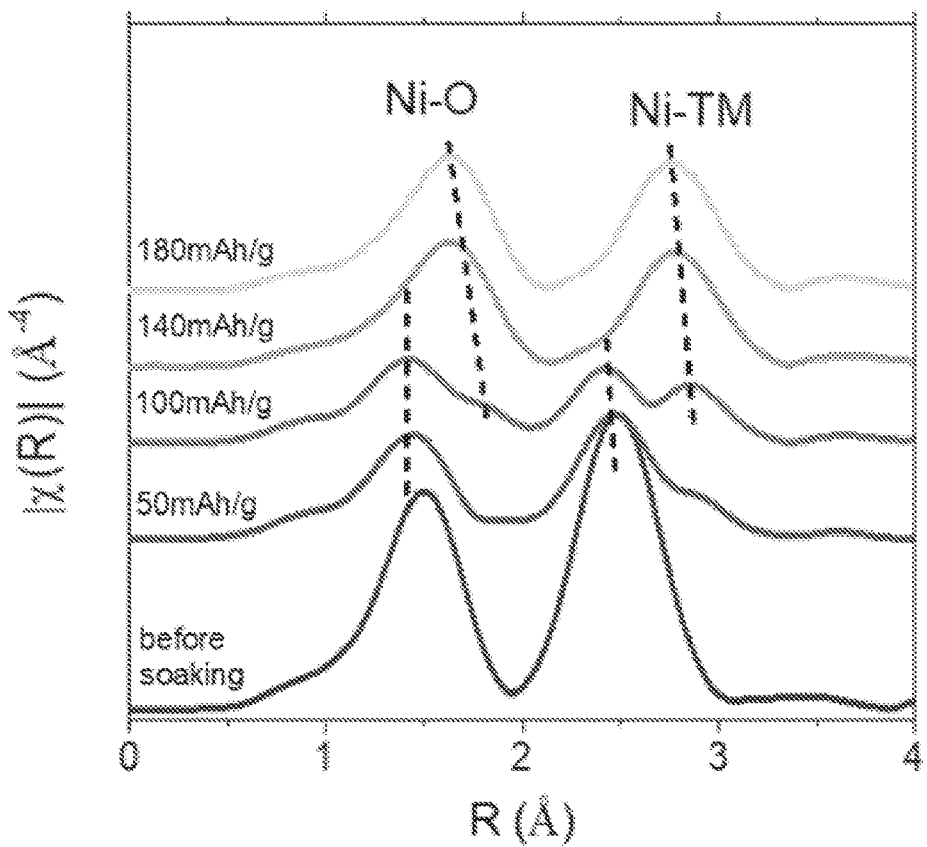
Figure 3A:
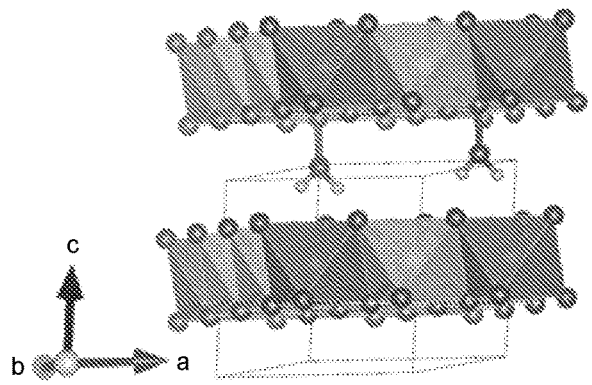
FIGS. 3A-3D show DFT relaxation investigation of the crystal structure evolution from the electrolyte soaking to the fully discharged states.
Figure 3B:
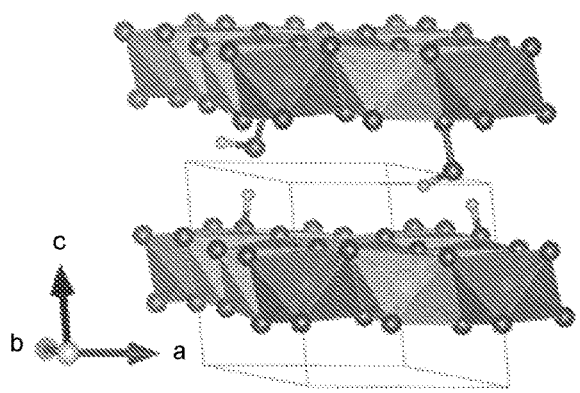
Figure 3C:
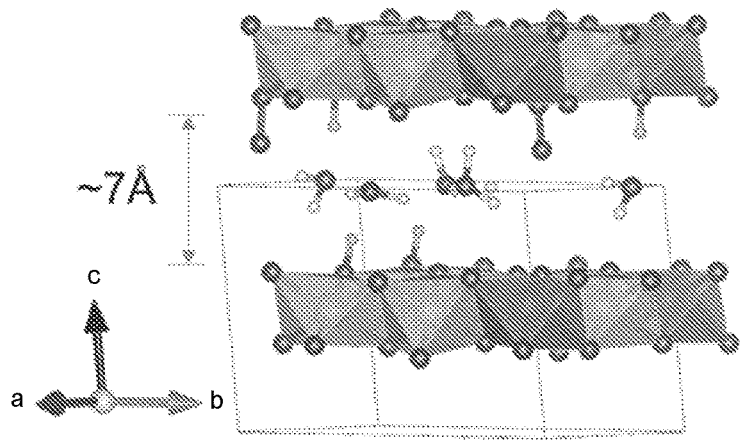
Figure 3D:
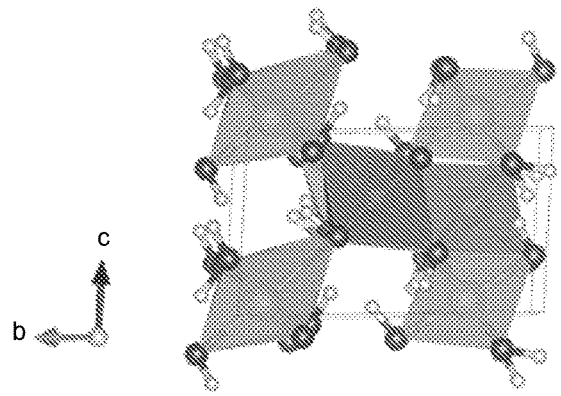
Figure 3E:
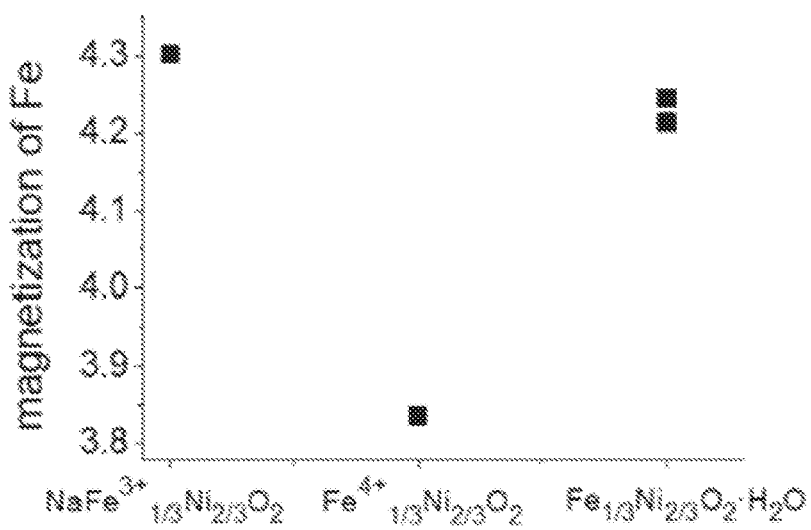
FIGS. 3E-3G show DFT calculated magnetization of Fe (FIG. 3E), Ni (FIG. 3F), and O (FIG. 3G) ions.
Figure 3F:
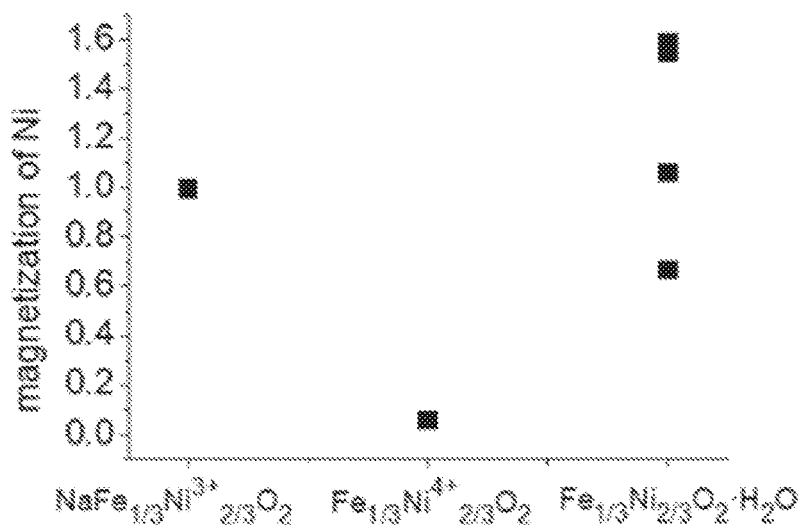
Figure 3G:
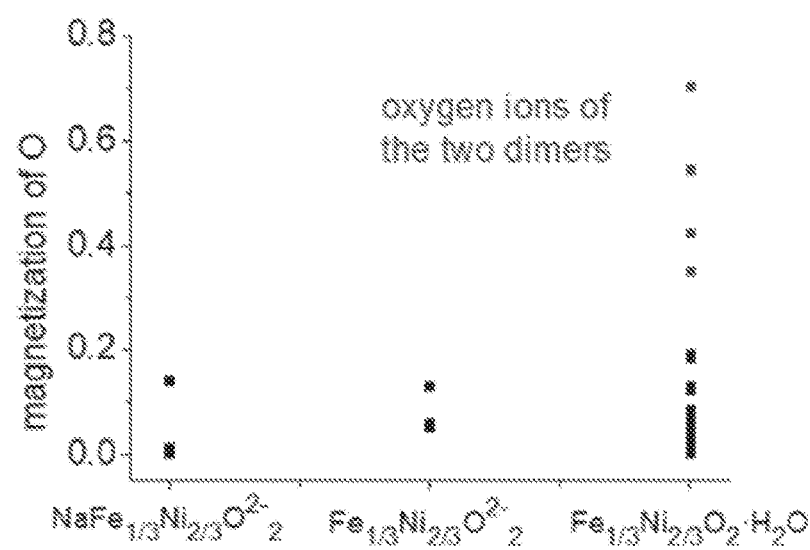
Figure 4A:
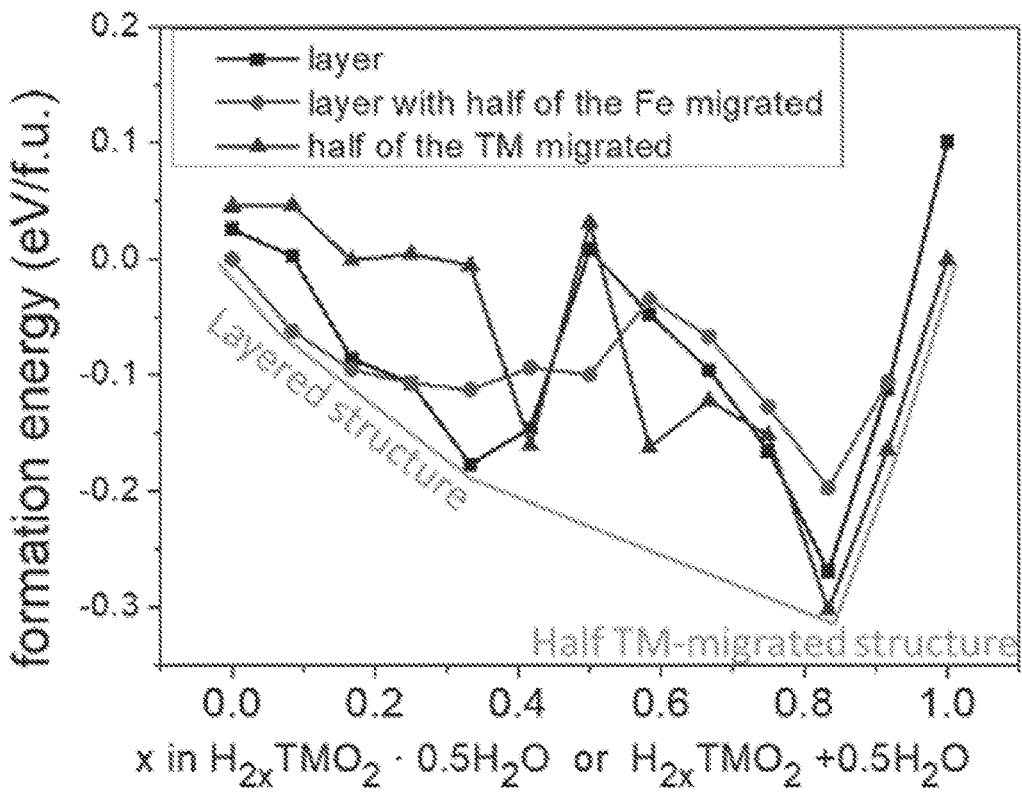
FIG. 4A shows DFT calculated formation energy for layer structure (squares), layer structure with half of the Fe migrated (circles) and half TM migrated structure (triangles) at different proton compositions. The unmarked line indicates the thermodynamically predicted phase evolution pathway.
Figure 4B:
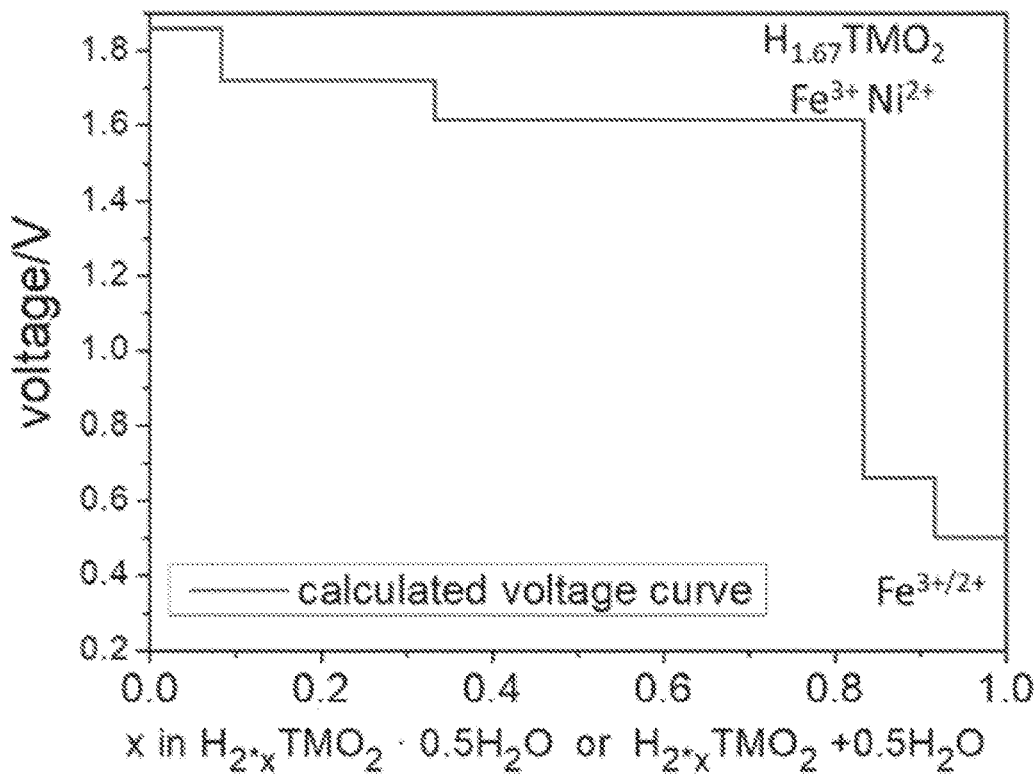
FIG. 4B shows calculated discharge voltage curve based on the predicted structural evolution pathway.
Figure 4C:
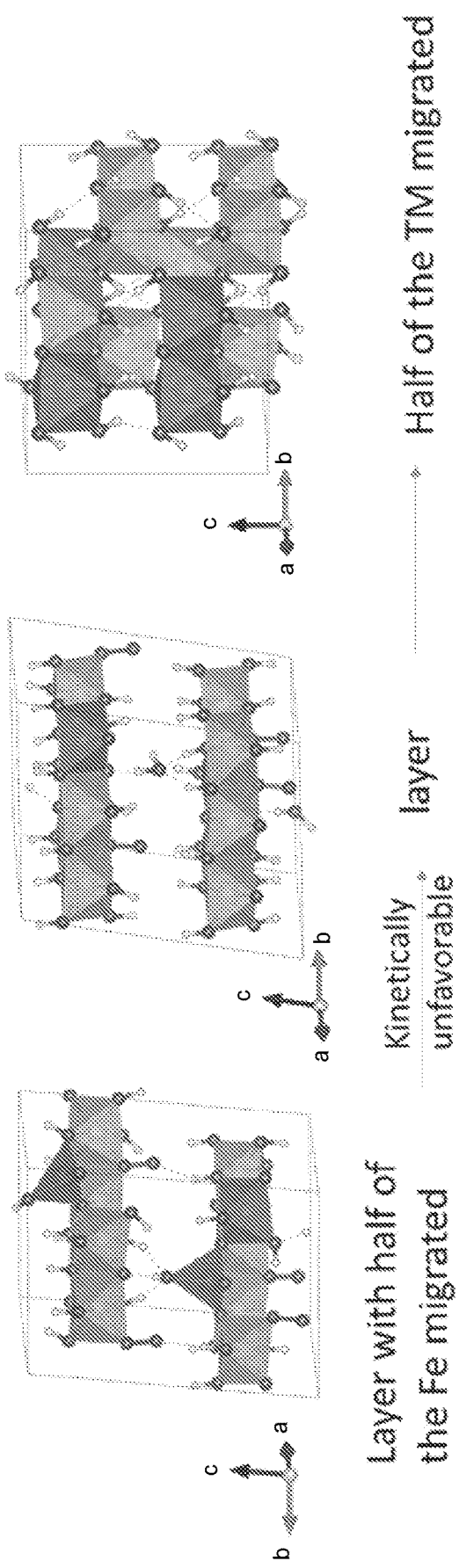
FIG. 4C shows visualizations of the three different structures at the sequence of appearance during the proton intercalation process.
Figure 5A:
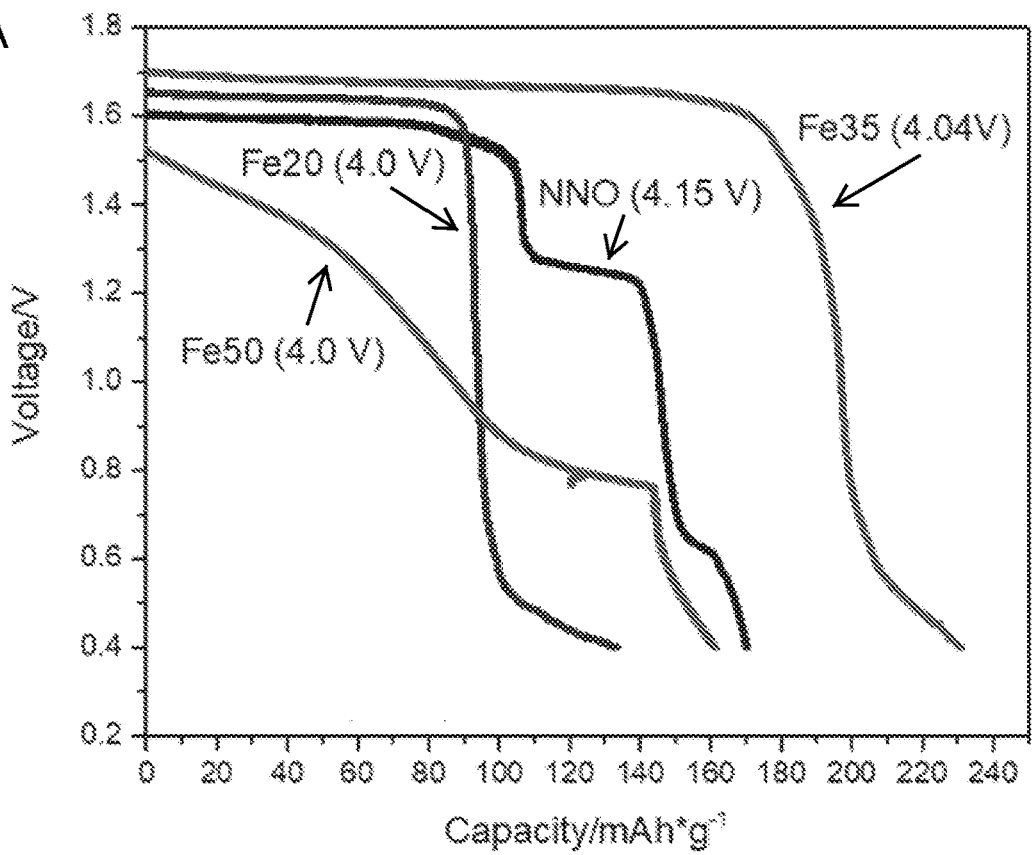
FIG. 5A shows comparison of the proton discharge performance of different cathodes versus Zn anode in aqueous alkaline electrolyte, where the cathodes are $Na_xNiO_2$ (NNO) taken from sodium ion battery at 4.15V versus Na metal (NNO 4.15V), $Na_x(Fe_{0.2}Ni_{0.8})O_2$ (Fe20 at 4.0V), $Na_x(Fe_{0.35}Ni_{0.65})O_2$ (Fe35 at 4.04 V) and $Na_x(Fe_{0.5}Ni_{0.5})O_2$ (Fe50 at 4.0V).
Figure 5B:
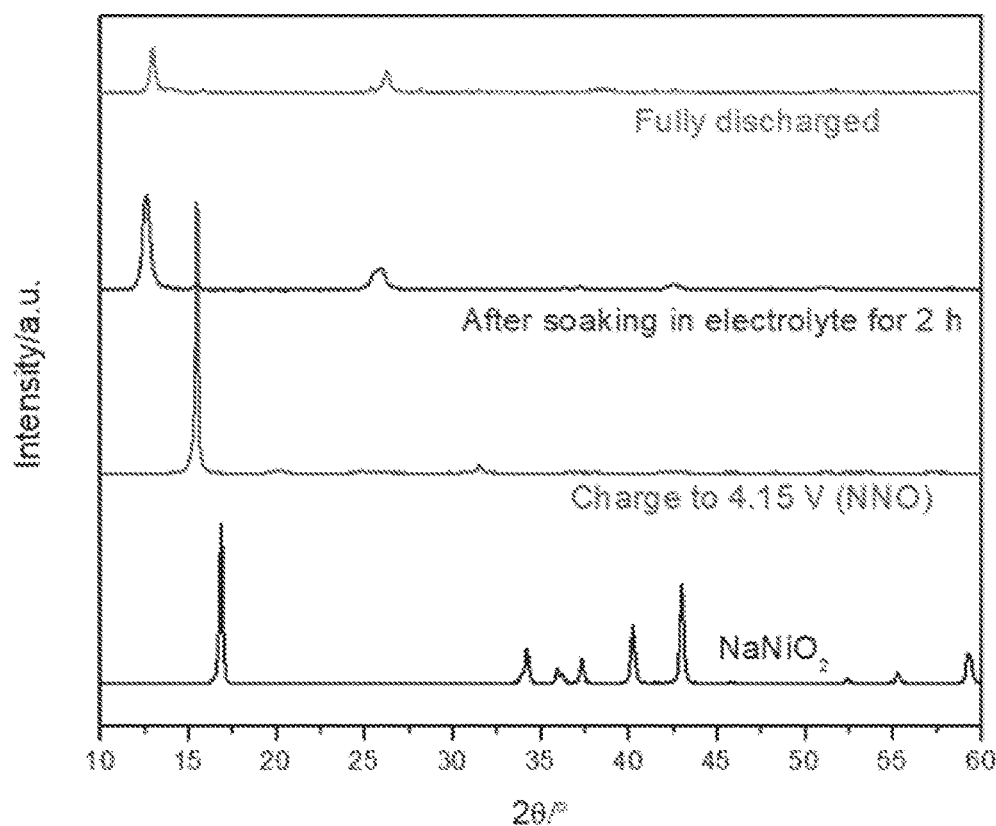
FIGS. 5B-5D show XRD characterization of the phase evolutions of NNO (FIG. 5B), Fe20 (FIG. 5C) and Fe50 (FIG. 5D) from pristine materials (bottom), charged state out of Na ion battery (2nd from bottom), after initial soaking in primary battery electrolyte (3rd from bottom) to the end of proton discharge (top).
Figure 5C:
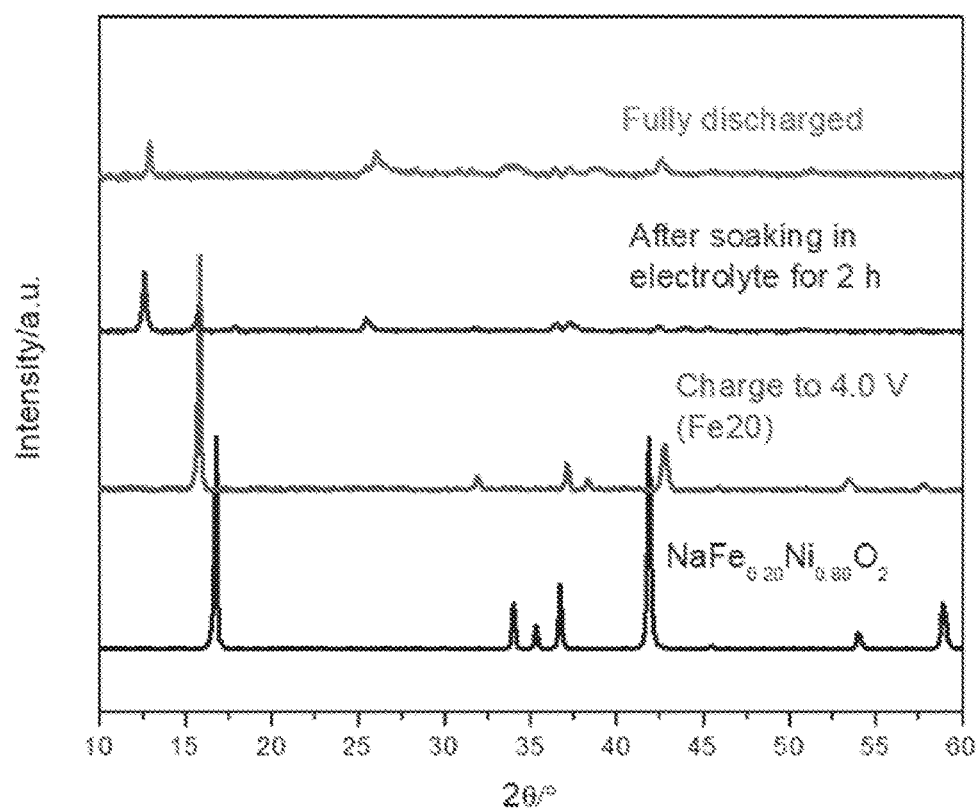
Figure 5D:
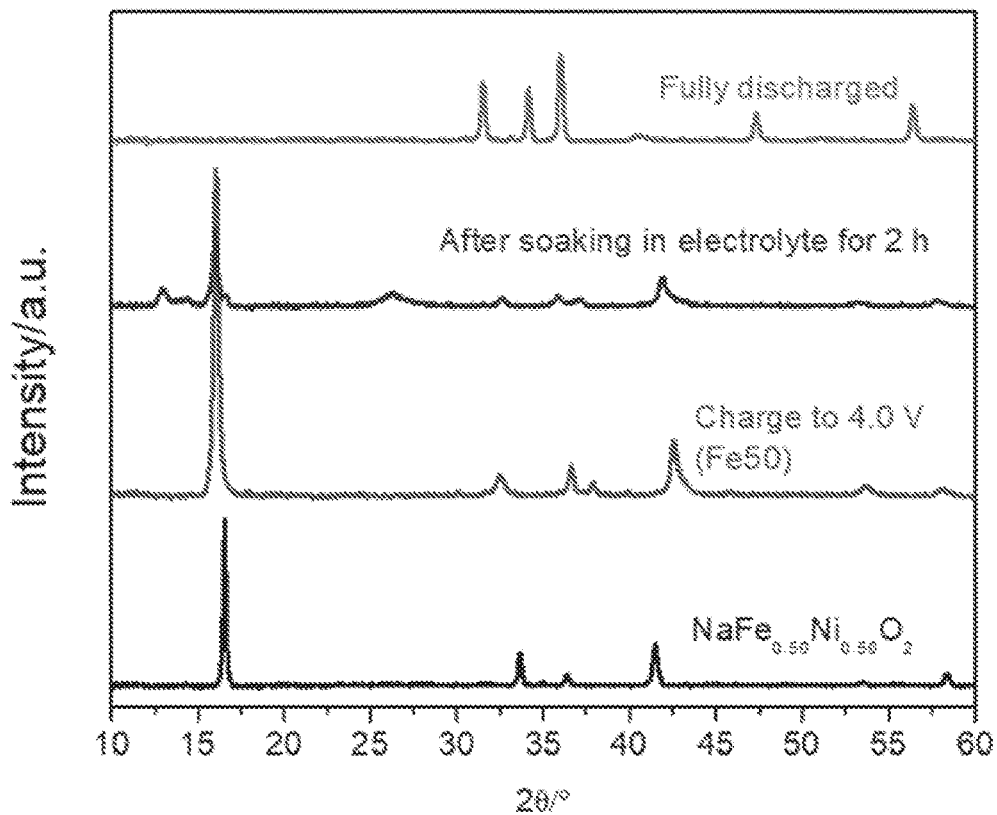

The phase and valence evolution of Fe35(4.04V) during proton intercalation or discharge was investigated by X-ray diffraction (XRD) (FIG. 1D-1E), X-ray absorption spectroscopy (XAS) (FIG. 2A-2E) and density functional theory (DFT) calculation (FIG. 3A-3G and FIG. 4A-4C). Fe35 was demonstrated to have certain Fe migration promoted by the water splitting inside the layer structure. During proton intercalation, the Fe migrated phase transformed to the half-transition metal (TM) migrated phase (FIG. 4C), which should be able to store protons up to a composition of $H_{1.67}Fe_{0.35}Ni_{0.65}O_2$. In this example, Fe35 reached about $Na_{0.24}H_{0.76}Fe_{0.35}Ni_{0.65}O_2$. This means there is still a potential proton intercalation capacity of 0.67 protons/formula that is not used yet. DFT simulations indicated that the 0.67 hidden proton capacity corresponds to the unused oxygen redox that was converted from the Fe and Ni redox during the water soaking and splitting processes before the initial proton discharge. A theoretical capacity of ~400 mAh/g could be obtained if reaching $H_{1.67}TMO_2$.

Figure 6A:
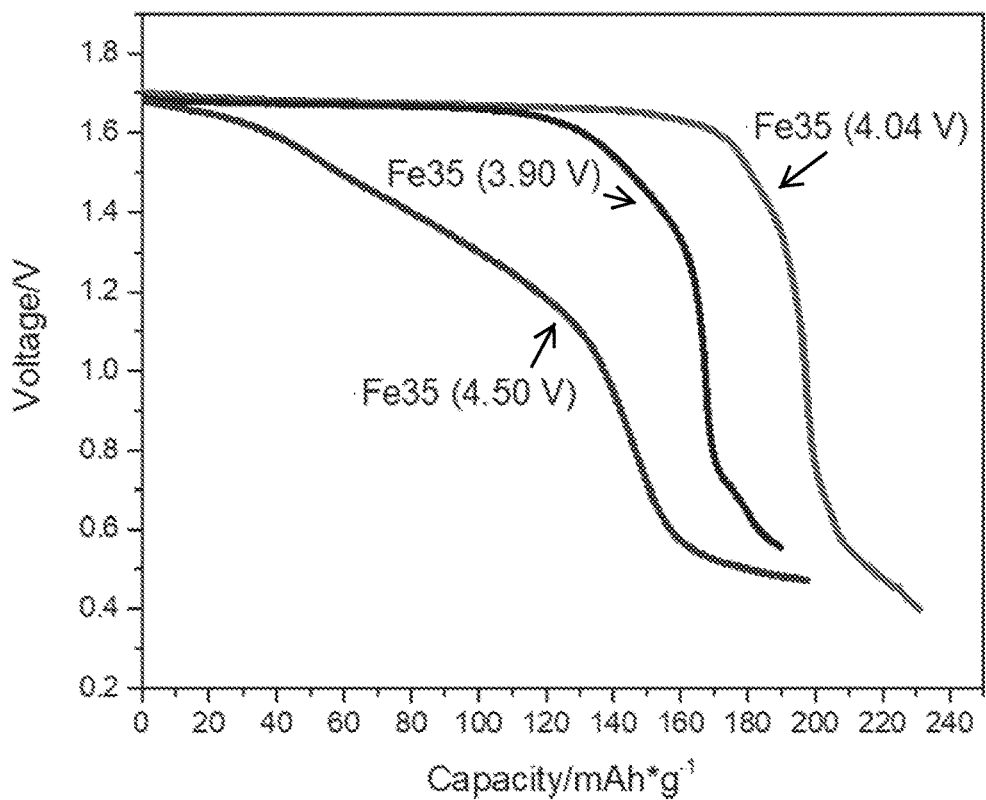
FIG. 6A shows comparison of the proton discharge performances of different Fe35 in aqueous alkaline electrolyte versus Zn anode. Fe35 cathodes were charged to different voltage states of 3.90V, 4.04V and 4.50V in Na ion batteries before being taken out for the primary battery measurement.
Figure 6B:
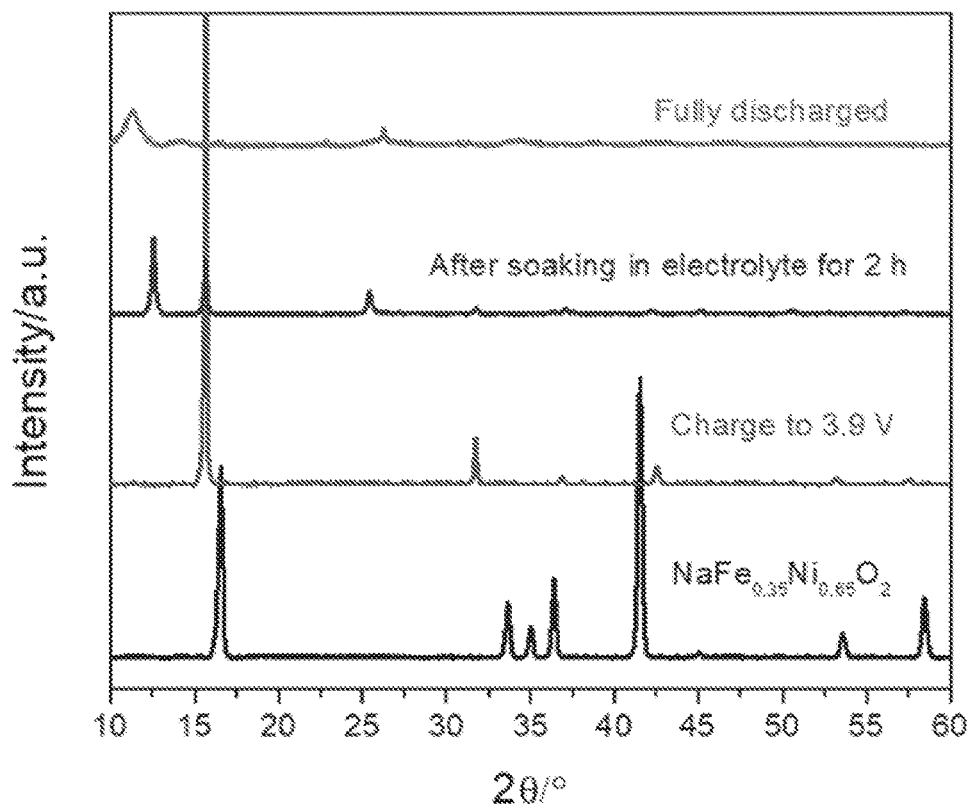
FIGS. 6B-6C show XRD characterization of phase evolutions of Fe35 with initial Na ion battery charge voltage of 3.9 V (FIG. 6B) and 4.5 V (FIG. 6C) from pristine materials to the end of proton discharge.
Figure 6C:
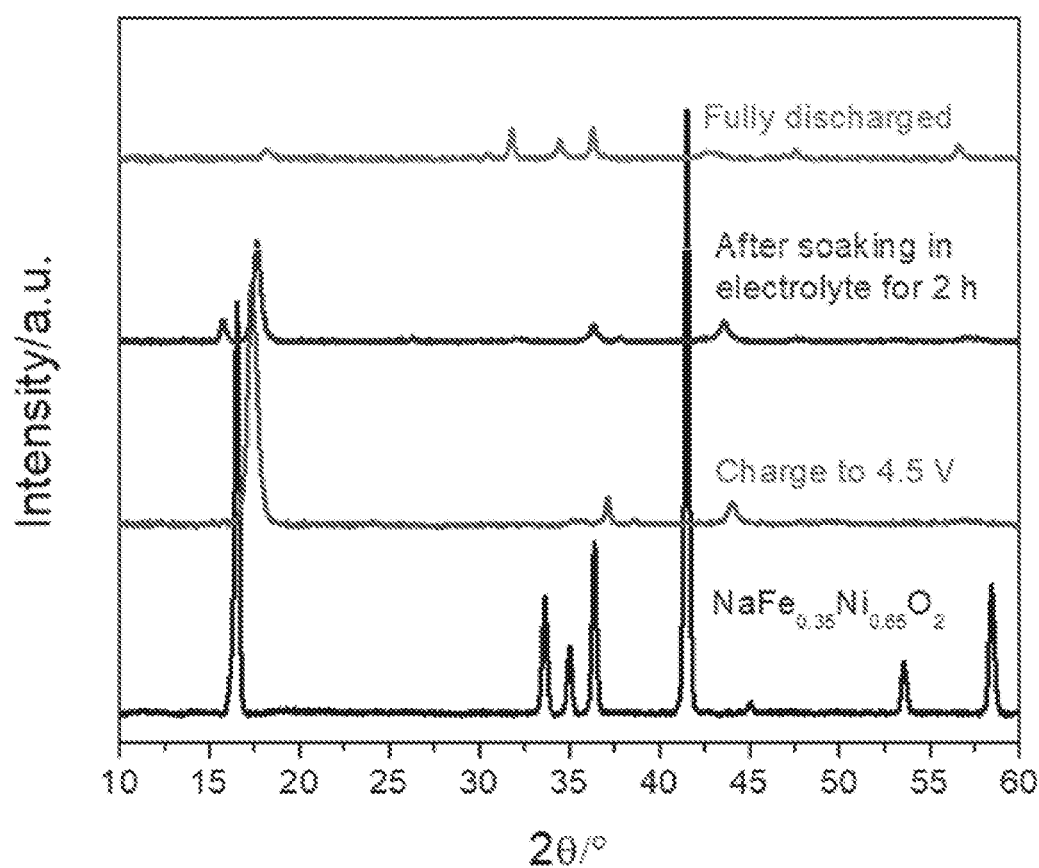

Changing the Fe composition in $NaFe_xNi_{1-x}O_2$ (FIG. 5A-5DC) or initial charge voltage (FIG. 6A-6C) will have significant effect on capacity, electrochemical voltage curve, and phase evolution during the discharge.

These results show that the water splitting induced irreversible oxygen redox may be prevented to preserve the accessible TM redox. Cu and Ti doping is also a very promising solution to prevent the water intercalation on the intrinsic material level. Suitable coating of the $NaFe_xNi_{1-x}O_2$ particle may also obstruct the water intercalation for a higher capacity.

Other embodiments are in the claims.

What is claimed is:

1. A primary battery comprising:
   (a) a negative electrode comprising a metal and an oxide of the metal;
   (b) a positive electrode comprising a desodiated sodium transition metal oxide of the formula $Na_xMO_2$; and
   (c) an electrolyte, wherein $0<x\leq1.5$ and M is one or more transition metal atoms.

2. The battery of claim 1, wherein the one or more transition metal atoms are selected from the group consisting of Ni, Co, Fe, Mn, Rh, Pt, Cu, Mo, W, and a combination thereof.

3. The battery of claim 2, wherein the one or more transition metal atoms are selected from the group consisting of Ni, Co, Fe, Mn, and a combination thereof.

4. The battery of claim 1, wherein the desodiated sodium transition metal oxide further comprises an alkali metal or alkaline earth metal atom.

5. The battery of claim 1, wherein the negative electrode comprises elemental zinc.

6. The battery of claim 5, wherein the negative electrode further comprises zinc oxide.

7. The battery of claim 1, wherein the electrolyte comprises 1M to 9M hydroxide.

8. The battery of claim 1, wherein the electrolyte further comprises zinc oxide.

9. The battery of claim 1, wherein the desodiated sodium transition metal oxide is desodiated from $NaNiO_2$, $NaCoO_2$, $NaFeO_2$, $NaMnO_2$, $Na_{0.67}MnO_2$, $NaFe_{0.24}Ni_{0.76}O_2$, $NaFe_{0.35}Ni_{0.65}O_2$, $NaFe_{0.5}Ni_{0.5}O_2$, $NaFe_{0.5}Co_{0.5}O_2$, $Na_{0.67}Fe_{0.5}Mn_{0.5}O_2$, $NaFe_{0.4}Mn_{0.2}Ni_{0.2}O_2$, $NaFe_yMn_{1-y}O_2$ ($0.05\leq y\leq 0.5$), $Na_{0.67}Ni_{1/3}Mn_{2/3}O_2$, $NaFe_{1/3}Ni_{1/3}Mn_{1/3}O_2$, $Na_{0.67}Mg_{0.23}Mn_{0.72}O_2$, $Na_{0.67}Mg_{0.205}Fe_{0.05}Ni_{0.1}Mn_{0.645}O_2$, $Na_{0.67}Mg_{0.23}Ni_{0.05}Mn_{0.72}O_2$, $Na_{0.67}Mg_{0.28}Ni_{0.05}Mn_{0.67}O_2$, $Na_{0.67}Mg_{0.205}Ni_{0.125}Mn_{0.67}O_2$, $Na_{0.67}Mg_{0.205}Fe_{0.05}Mn_{0.745}O_2$, $Na_{0.67}Mg_{0.28}Fe_{0.1}Mn_{0.62}O_2$, $Na_{0.67}Mg_{0.24}Fe_{0.18}Mn_{0.58}O_2$, $Na_{0.67}Mg_{0.205}Fe_{0.05}Co_{0.05}Mn_{0.645}O_2$, $Na_{0.7}Ni_{1.1}O_2$, $Na_{0.55}Ni_{1.15}O_2$, $Na_{0.75}Li_{0.1}Ni_{0.15}(Fe_{0.35}Ni_{0.65})_{0.9}O_2$, $Na_{0.6}Li_{0.1}Ni_{0.2}(Fe_{0.35}Ni_{0.65})_{0.9}O_2$, $Na_xFe_{0.35}Ni_{0.75}O_2$ ($0.6\leq x\leq 0.9$), or $Na_xFe_yNi_zO_2$, ($0.5\leq x\leq 1$, $0\leq y\leq 0.5$, $1\leq z\leq 1.3$).

10. The battery of claim 1, wherein the desodiated sodium transition metal oxide is one or more of $Na_{0.4}NiO_2$, $Na_{0.29}NiO_2$, $Na_{0.24}NiO_2$, $Na_{0.38}CoO_2$, $Na_{0.25}CoO_2$, $Na_{0.79}FeO_2$, $Na_{0.5}FeO_2$, $Na_{0.2}MnO_2$, $Na_{0.12}MnO_2$, $Na_{0.15}MnO_2$, $Na_{0.25}MnO_2$, $Na_{0.4}MnO_2$, $Na_{0.34}Fe_{0.24}Ni_{0.76}O_2$, $Na_{0.25}Fe_{0.24}Ni_{0.76}O_2$, $Na_{0.13}Fe_{0.24}Ni_{0.76}O_2$, $Na_{0.33}Fe_{0.35}Ni_{0.65}O_2$, $Na_{0.24}Fe_{0.35}Ni_{0.65}O_2$, $Na_{0.05}Fe_{0.35}Ni_{0.65}O_2$, $Na_{0.45}Fe_{0.5}Ni_{0.5}O_2$, $Na_{0.35}Fe_{0.5}Ni_{0.5}O_2$, $Na_{0.25}Fe_{0.5}Ni_{0.5}O_2$, $Na_{0.18}Fe_{0.5}Co_{0.5}O_2$, $Na_{0.27}Fe_{0.5}Co_{0.5}O_2$, $Na_{0.32}Fe_{0.5}Mn_{0.5}O_2$, $Na_{0.25}Fe_{0.5}Mn_{0.5}O_2$, $Na_{0.19}Fe_{0.5}Mn_{0.5}O_2$, $Na_{0.09}Ni_{1/3}Mn_{2/3}O_2$, $Na_{0.36}Fe_{1/3}Ni_{1/3}Mn_{1/3}O_2$, $Na_{0.23}Fe_{1/3}Ni_{1/3}Mn_{1/3}O_2$, $Na_{0.17}Fe_{1/3}Ni_{1/3}Mn_{1/3}O_2$, $Na_{0.46}Mg_{0.28}Mn_{0.72}O_2$, $Na_{0.42}Mg_{0.28}Mn_{0.72}O_2$, $Na_{0.39}Mg_{0.28}Mn_{0.72}O_2$, $Na_{0.35}Mg_{0.28}Mn_{0.72}O_2$, $Na_{0.32}Mg_{0.28}Mn_{0.72}O_2$, $Na_{0.28}Mg_{0.28}Mn_{0.72}O_2$, $Na_{0.27}Mg_{0.28}Mn_{0.72}O_2$, $Na_{0.25}Mg_{0.28}Mn_{0.72}O_2$, $Na_{0.45}Mg_{0.205}Fe_{0.05}Ni_{0.1}Mn_{0.645}O_2$, $Na_{0.38}Mg_{0.205}Fe_{0.05}Ni_{0.1}Mn_{0.645}O_2$, $Na_{0.36}Mg_{0.205}Fe_{0.05}Ni_{0.1}Mn_{0.645}O_2$, $Na_{0.34}Mg_{0.205}Fe_{0.05}Ni_{0.1}Mn_{0.645}O_2$, $Na_{0.31}Mg_{0.205}Fe_{0.05}Ni_{0.1}Mn_{0.645}O_2$, $Na_{0.33}Mg_{0.23}Ni_{0.05}Mn_{0.72}O_2$, $Na_{0.29}Mg_{0.23}Ni_{0.05}Mn_{0.72}O_2$, $Na_{0.35}Mg_{0.28}Ni_{0.05}Mn_{0.67}O_2$, $Na_{0.32}Mg_{0.28}Ni_{0.05}Mn_{0.67}O_2$, $Na_{0.33}Mg_{0.2}O_5Ni_{0.125}Mn_{0.6}O_2$, $Na_{0.29}Mg_{0.205}Ni_{0.125}Mn_{0.602}$, $Na_{0.33}Mg_{0.205}Fe_{0.05}Mn_{0.745}O_2$, $Na_{0.29}Mg_{0.205}Fe_{0.05}Mn_{0.745}O_2$, $Na_{0.35}Mg_{0.2}O_5Fe_{0.05}Co_{0.05}Mn_{0.645}O_2$, $Na_{0.32}Mg_{0.205}Fe_{0.05}Co_{0.05}Mn_{0.645}O_2$.

11. The battery of claim 1, wherein the desodiated sodium transition metal oxide is one or more of $Na_{0.29}NiO_2$, $Na_{0.33}Fe_{0.35}Ni_{0.65}O_2$, $Na_{0.24}Fe_{0.35}Ni_{0.65}O_2$, $Na_{0.19}Fe_{0.5}Mn_{0.5}O_2$, $Na_{0.32}Mg_{0.28}Mn_{0.72}O_2$, $Na_{0.28}Mg_{0.28}Mn_{0.72}O_2$, $Na_{0.34}Mg_{0.2}O_5Fe_{0.05}Ni_{0.1}Mn_{0.645}O_2$, $Na_{0.31}Mg_{0.2}O_5Fe_{0.05}Ni_{0.1}Mn_{0.645}O_2$.

12. The battery of claim 1, wherein the desodiated sodium transition metal oxide is $Na_{0.24}H_{0.76}Fe_{0.35}Ni_{0.65}O_2$.

* * * * *